United States Patent
Matsumoto et al.

(10) Patent No.: US 10,666,995 B2
(45) Date of Patent: May 26, 2020

(54) INFORMATION PROCESSING APPARATUS, INFORMATION PROCESSING SYSTEM, AND PROGRAM

(71) Applicant: Sony Corporation, Tokyo (JP)

(72) Inventors: Kyosuke Matsumoto, Kanagawa (JP); Yushi Yamabe, Tokyo (JP); Tetsunori Itabashi, Kanagawa (JP); Kohei Asada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/767,525

(22) PCT Filed: Aug. 25, 2016

(86) PCT No.: PCT/JP2016/074784
§ 371 (c)(1),
(2) Date: Apr. 11, 2018

(87) PCT Pub. No.: WO2017/068858
PCT Pub. Date: Apr. 27, 2017

(65) Prior Publication Data
US 2018/0293970 A1 Oct. 11, 2018

(30) Foreign Application Priority Data
Oct. 19, 2015 (JP) .................. 2015-205389

(51) Int. Cl.
*H04N 21/2387* (2011.01)
*H04N 21/6587* (2011.01)
(Continued)

(52) U.S. Cl.
CPC ....... *H04N 21/2387* (2013.01); *G10K 11/178* (2013.01); *G10L 19/00* (2013.01);
(Continued)

(58) Field of Classification Search
CPC .... G10L 19/00; H04N 5/783; H04N 21/2387; H04N 21/6587; G11B 27/00;
(Continued)

(56) References Cited

U.S. PATENT DOCUMENTS 5,717,818 A 2/1998 Nejime et al.
6,721,710 B1 * 4/2004 Lueck ............... G10L 19/16
369/59.21

(Continued)

FOREIGN PATENT DOCUMENTS

EP 643380 A2 3/1995
JP 06-259884 A 9/1994
(Continued)

OTHER PUBLICATIONS

International Search Report and English translation thereof dated Nov. 29, 2016 in connection with International Application No. PCT/JP2016/074784.

(Continued)

*Primary Examiner* — Andrew C Flanders
(74) *Attorney, Agent, or Firm* — Wolf, Greenfield & Sacks, P.C.

(57) ABSTRACT

[Object] To provide an information processing apparatus by which sound can be smoothly re-listened to.
[Solution] There is provided an information processing apparatus including: a reproduction processing unit that performs reproduction of a recorded sound on a basis of a reproduction start instruction for starting re-listening of the recorded sound from a position tracking back a predetermined time from a reproduction start time, at which the reproduction start instruction is input, to a position of a present time.

14 Claims, 12 Drawing Sheets

(51) Int. Cl.
*G11B 27/00* (2006.01)
*G11B 27/10* (2006.01)
*H04N 5/783* (2006.01)
*H04R 25/00* (2006.01)
*G10L 19/00* (2013.01)
*G11B 27/34* (2006.01)
*G11B 20/10* (2006.01)
*G10K 11/178* (2006.01)

(52) U.S. Cl.
CPC ............ *G11B 20/10* (2013.01); *G11B 27/002* (2013.01); *G11B 27/005* (2013.01); *G11B 27/102* (2013.01); *G11B 27/34* (2013.01); *H04N 5/783* (2013.01); *H04N 21/6587* (2013.01); *H04R 25/00* (2013.01); *H04R 2225/41* (2013.01)

(58) Field of Classification Search
CPC ... G11B 27/002; G11B 27/005; G11B 27/007; G06F 3/16; G06F 3/162; G06F 3/165; G06F 3/167
See application file for complete search history.

(56) References Cited

U.S. PATENT DOCUMENTS

| | | | | |
|---|---|---|---|---|
| 9,749,676 | B2* | 8/2017 | Sood | G11B 27/005 |
| 2003/0009246 | A1* | 1/2003 | Van De Kerkhof | G11B 20/10527 700/94 |
| 2008/0240475 | A1* | 10/2008 | Blumenau | H04R 25/502 381/312 |
| 2009/0158326 | A1* | 6/2009 | Hunt | G06F 3/04817 725/38 |
| 2011/0038496 | A1* | 2/2011 | Lott | H04R 5/033 381/309 |
| 2013/0139059 | A1 | 5/2013 | Koga | |
| 2013/0252675 | A1* | 9/2013 | Nicholson | G10K 11/17833 455/570 |
| 2013/0301849 | A1 | 11/2013 | Alderson et al. | |
| 2015/0024348 | A1* | 1/2015 | Elazizi | G09B 5/02 434/112 |
| 2015/0154982 | A1* | 6/2015 | Hong | H04N 5/783 704/275 |
| 2015/0332732 | A1* | 11/2015 | Gilson | G11B 27/036 386/240 |
| 2016/0066090 | A1* | 3/2016 | Park | G11B 27/034 381/92 |
| 2016/0302012 | A1* | 10/2016 | Sprague | G10L 13/043 |

FOREIGN PATENT DOCUMENTS

| | | |
|---|---|---|
| JP | 07-129190 A | 5/1995 |
| JP | 2004-104757 A | 4/2004 |
| JP | 2004-205578 A | 7/2004 |
| JP | 2005-165183 A | 6/2005 |
| JP | 2006-203900 A | 8/2006 |
| JP | 2012-134919 A | 7/2012 |
| JP | 2013-114723 A | 6/2013 |
| JP | 2015-517683 A | 6/2015 |
| JP | 2015-139083 A | 7/2015 |
| WO | WO 2013/169454 A2 | 11/2013 |

OTHER PUBLICATIONS

Kinoshita et al., Suppression of Late Reverberation Effect on Speech Signal Using Long-Term Multiple-step Linear Prediction, IEEE Transactions on Audio, Speech, and Language Processing, vol. 17, No. 4, May 2009, pp. 1-12.

Morita et al., Time-Scale Modification Algorithm for Speech by Use of Pointer Interval Control Overlap and Add (PICOLA) and Its Evaluation, School of Engineering, Nagoya University, Jan. 4, 2014, pp. 149-150, 7 pages including English Translation.

Noguchi et al., Non-Stationary Noise Detection and Reduction of a Single Channel Input, NTT Cyber Space Labs, NTT Corp, Tokyo, Japan, 3-P-30, Mar. 2004, pp. 655-656, 9 pages including English Translation.

Written Opinion and English translation thereof dated Nov. 29, 2016 in connection with International Application No. PCT/JP2016/074784.

International Preliminary Report on Patentability and English translation thereof dated May 3, 2018 in connection with International Application No. PCT/JP2016/074784.

* cited by examiner

INFORMATION PROCESSING APPARATUS, INFORMATION PROCESSING SYSTEM, AND PROGRAM

CROSS-REFERENCE TO RELATED APPLICATIONS

This application is a U.S. National Stage entry under 35 U.S.C. § 371 of International Application No. PCT/JP2016/074784, filed in the Japan Patent Office on Aug. 25, 2016, which claims priority to Patent Application No. 2015-205389, filed in the Japan Patent Office on Oct. 19, 2015, each of which is incorporated by reference herein in its entirety.

TECHNICAL FIELD

The present disclosure relates to an information processing apparatus, an information processing system, and a program.

BACKGROUND ART

A function of re-listening of missing sound when a user misses some sound in a hearing-aid apparatus is provided. According to Patent Literature 1, for example, a past sound signal to be listened to again and current input sound are provided at the same time after processing is performed thereon such that the past sound signal and the current input sound can be easily distinguished.

CITATION LIST

Patent Literature

Patent Literature 1: JP 2012-134919A

Non-Patent Literature

Non-Patent Literature 1: Morita and Itakura, "Expansion and compression of sound in time axis using pointer interval controlled overlap and add (PICOLA) and evaluation thereof", S61. 10, pp. 149-150

Non-Patent Literature 2: Noguchi, Bannai, Hata, and Kataoka "Distinction and removal of sudden noise in 1-channel input signal", Journal of The Acoustical Society of Japan, pp. 655 to 656, March 2004

Non-Patent Literature 3: H. Kinoshita, M. Delcroix, T. Nakatani and M. Miyoshi, "Suppression of late reverberation effect on speech signal using long-term multiple-step linear prediction", IEEE Trans. Audio, Speech and Lang. Proc., Vol. 17, No. 4, pp. 534-545, 2009

DISCLOSURE OF INVENTION

Technical Problem

However, there are many cases in which users that use hearing-aid apparatuses generally have difficulty in listening to sounds of a plurality of speakers. Therefore, even if two sounds can be distinguished as in Patent Literature 1 described above, there is a possibility that the simultaneous sound provision is not a sufficient function as re-listening reproduction. In addition, since the sound itself to which users desire to listen again is sound to which the users has once missed listening, it is necessary for the users to listen to the sound with further concentration when the users hear the sound again. From this point of view, it is not possible to state that simultaneous provision of past sound and current sound can provide sound to which users can easily listen, and the simultaneous provision is not sufficient as the re-listening reproduction function.

In addition, there is also a hearing-aid apparatus provided with a voice memo function capable of performing sound recording on sound necessary for users. However, since it is necessary for the users to press a button or the like to explicitly provide instructions for starting and completing the sound recording and an instruction for reproduction, the voice memo function is inconvenient for promptly reproducing the re-listening sound during conversation.

Thus, the present disclosure proposes a novel and improved information processing apparatus, information processing system, and program by which sound can be smoothly re-listened to.

Solution to Problem

According to the present disclosure, there is provided an information processing apparatus including: a reproduction processing unit that performs reproduction of a recorded sound on a basis of a reproduction start instruction for starting re-listening of the recorded sound from a position tracking back a predetermined time from a reproduction start time, at which the reproduction start instruction is input, to a position of a present time.

In addition, according to the present disclosure, there is provided an information processing system including: a first device that acquires and outputs sound; and a second device that includes a reproduction processing unit that performs reproduction of a recorded sound acquired by the first device on a basis of a reproduction start instruction for starting re-listening of the recorded sound from a position tracking back a predetermined time from a reproduction start time, at which the reproduction start instruction is input, to a position of a present time.

Further, according to the present disclosure, there is provided a program for causing a computer to function as: a reproduction processing unit that performs reproduction of a recorded sound on a basis of a reproduction start instruction for starting re-listening of the recorded sound from a position tracking back a predetermined time from a reproduction start time, at which the reproduction start instruction is input, to a position of a present time.

Advantageous Effects of Invention

Thus, the present disclosure proposes a novel and improved information processing apparatus, an information processing system, and a program by which re-listening sound can be smoothly reproduced. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
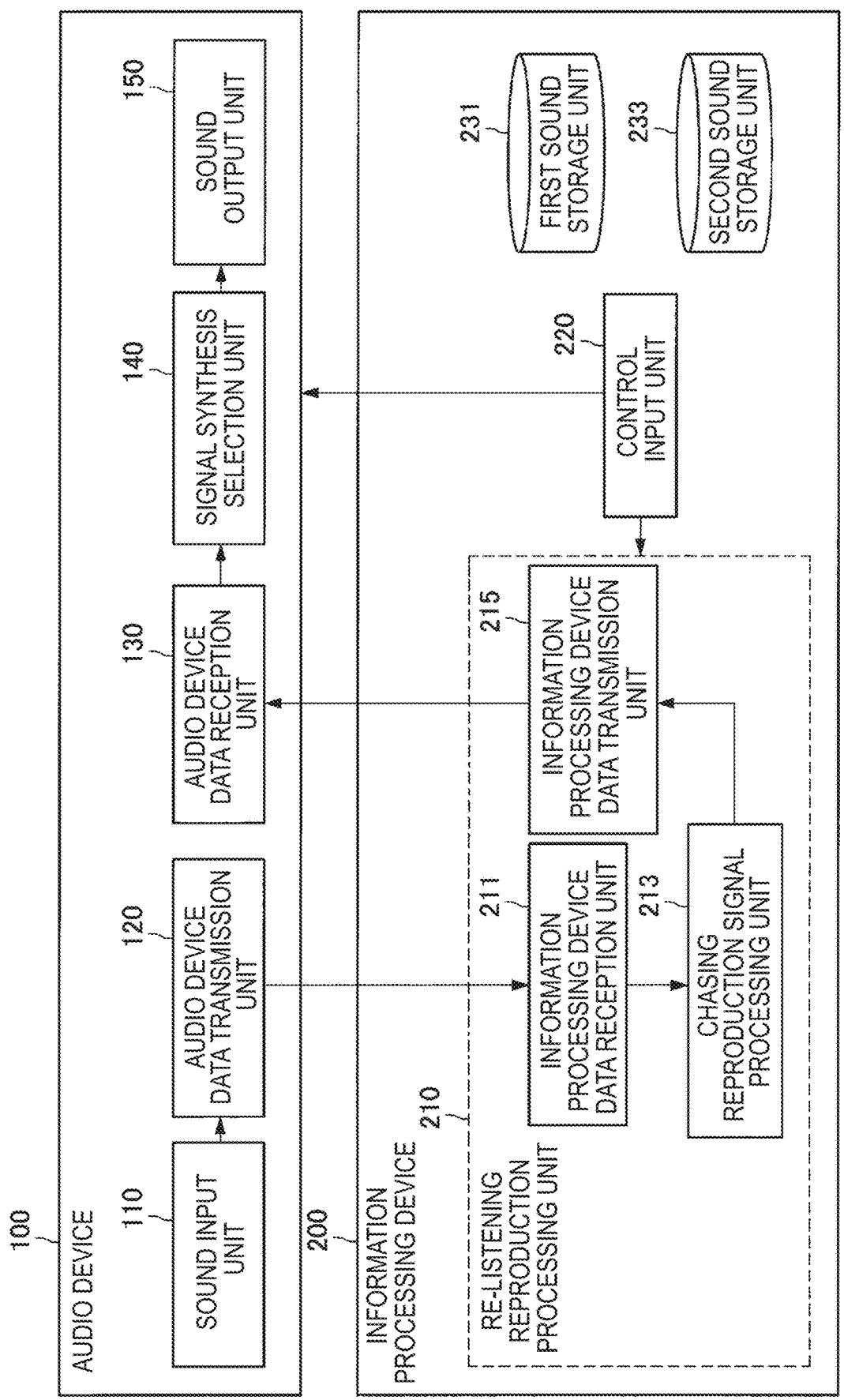
FIG. 1 is a functional block diagram illustrating a minimum functional configuration of a hearing-aid system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, a hearing-aid system that provides a function by which sound can be re-listened to in real time will be described as a preferred mode of an information processing system according to the present disclosure. Such a hearing-aid system performs reproduction of a recorded sound on a basis of a reproduction start instruction for starting re-listening of the recorded sound from a position tracking back a predetermined time from a re-listening start time, at which a re-listening start instruction is input, to a position of a present time. If the reproduction of the recorded sound reaches the present time, only ordinary real-time sound is provided. A user can smoothly perform re-listening of desired sound merely by performing a re-listening start operation. In addition, the following description will be given on the assumption that a sound monitor includes a hearing assistant and a hearing-aid that is a medical tool.

In addition, the description will be given in the following order.
1. First embodiment (separate type: hearing-aid system)
1.1 System configuration
(1) Minimum configuration
(2) Applied configuration
1.2 Re-listening reproduction processing
(1) Case in which only instruction for starting re-listening reproduction is provided
(2) Case in which there is instruction for completing re-listening reproduction
1.3 Supplementary note
(1) Non-stationary noise suppression processing
(2) Simultaneous hearing of re-listening sound and real-time sound
1.4 Conclusion
2. Second embodiment (integrated type: hearing-aid apparatus)
(1) Minimum configuration
(2) Applied configuration
3. Hardware configuration examples

1. First Embodiment

[1.1 System Configuration]

First, a functional configuration of a hearing-aid system according to a first embodiment of the present disclosure will be described with reference to FIGS. 1 and 2. The hearing-aid system according to the embodiment includes an audio device 100 that acquires sound and outputs sound and an information processing device 200 that performs control for sound reproduction by the audio device 100.

(1) Minimum Configuration

First, a minimum functional configuration of the hearing-aid system according to the embodiment will be described on the basis of FIG. 1. The hearing-aid system illustrated in FIG. 1 enables execution of a re-listening reproduction function in addition to an ordinary hearing-aid function as minimum functions.

(Audio Device)

The audio device 100 is a component that is worn by a user on his/her ears and used, and for example, is an earphone, a headphone, or the like that is used by being connected to a device provided with an information processing function, for example. Although a closed type of wearing on both ears is assumed as a shape of the earphone, the present disclosure is not limited to such an example. The audio device 100 includes a sound input unit 110, an audio device data transmission unit 120, an audio device data reception unit 130, a signal synthesis selection unit 140, and a sound output unit 150 as illustrated in FIG. 1.

The sound input unit 110 is a sound monitor unit that acquires external sound, and includes, for example, one or a plurality of microphones, an A/D converter, and the like. The sound input unit 110 converts a surrounding audio signal into digital waveform data and outputs the digital waveform data to the audio device data transmission unit 120.

The audio device data transmission unit 120 transmits the digital signal, which has been input from the sound input unit 110, to the information processing device 200. The digital signal may be transmitted through wired transmission or wireless transmission. In a case of the wireless transmission, for example, the transmission can be implemented by Bluetooth (registered trademark) or the like.

The audio device data reception unit 130 receives encoded waveform data of re-listening sound which has been received from the information processing device 200. The audio device data reception unit 130 decodes received streaming data into raw waveform data (PCM) on which signal processing can be performed and outputs the data to the signal synthesis selection unit 140.

The signal synthesis selection unit 140 performs processing of generating a sound signal to be output from the sound output unit 150 in accordance with an input from a control input unit 220, which will be described later, and outputs the sound signal to the sound output unit 150. For example, the past sound received from the information processing device 200 is output when re-listening reproduction of the acquired sound is performed, and the re-listening sound is not output in the other cases.

The sound output unit 150 is an output unit that provides sound to a user and includes, for example, a D/A converter, a driver unit, or the like. The sound output unit 150 converts sound digital data after processing is performed thereon by the signal synthesis selection unit 140 into an audio signal and outputs the audio signal.

In the audio device, the sound input unit 110 and the sound output unit 150 may perform independent operations or non-independent operations for each of left and right ears in a case of being wearable on both the ears.

(Information Processing Device)

The information processing device 200 is a device provided with an information processing function, and for example, is an information processing terminal or the like, such as a smartphone, capable of pairing with the audio device 100, for example. The information processing device 200 includes a re-listening reproduction processing unit 210, a control input unit 220, a first sound storage unit 231, and a second sound storage unit 233.

The re-listening reproduction processing unit 210 is a functional unit that performs processing for the re-listening reproduction of the recorded sound, and includes an information processing device data reception unit 211, a chasing reproduction signal processing unit 213, and an information processing device data transmission unit 215 as illustrated in FIG. 1.

The information processing device data reception unit 211 receives a data stream from the audio device data transmission unit 120, decodes encoded data, and acquires sound waveform data. The information processing device data reception unit 211 outputs the acquired sound waveform data to the chasing reproduction signal processing unit 213.

The chasing reproduction signal processing unit 213 analyzes the sound data input from the information processing device data reception unit 211 and performs processing of outputting sound from a time tracking back a predetermined time in accordance with the input from the control input unit 220. Note that, hereinafter, a sound signal that reaches a user's ears after the signal processing is performed thereon by the chasing reproduction signal processing unit 213 will also be referred to as "re-listening sound", while a sound signal that reaches a user's ears without not being subjected to the signal processing by the chasing reproduction signal processing unit 213 will also be referred to as "real-time sound". The chasing reproduction signal processing unit 213 can reproduce the re-listening sound with shortening a reproduction time in accordance with the input from the control input unit 220. For example, at least a part of the reproduction sound may be reproduced at a faster reproduction speed than the unmultiplied speed. The processing may, for example, apply a technology of performing reproduction with increasing a speech speed without changing a sound pitch thereof (see Non-Patent Literature 1, for example). The chasing reproduction signal processing unit 213 outputs the generated reproduction signal to the information processing device data transmission unit 215.

In addition, as another time-shortening reproduction method, a time section in which no human voice is present or a no-sound section may be automatically detected as a skip target section, and reproduction may be performed while skipping at least a part of the skip target section. For the detection of the skip target section, determination may be made on the basis that a time section during which a sound volume level does not exceed a predetermined threshold value continues for a predetermined time or longer is skipped, for example. In addition, it is also possible to simultaneously perform the time-shortening by changing the reproduction speed and the time-shortening by the skip reproduction.

The information processing device data transmission unit 215 encodes the sound after the processing is performed thereon by the chasing reproduction signal processing unit 213 and transmits the encoded sound to the audio device 100.

The control input unit 220 controls the functions of the audio device 100 and the information processing device 200 in response to operation inputs from a user. For example, the control input unit 220 causes execution of the re-listening reproduction function and causes completion of the re-listening reproduction function on the basis of operation inputs from a user. In addition, the control input unit 220 performs various kinds of setting of a sound volume and the like of the audio device 100 on the basis of an operation input from a user. In addition, a device that is directly operated by a user is not limited to the information processing device 200 although not illustrated in the drawing. For example, it is also assumed that a user input is provided to the control input unit 220 by the user operating a computer, a remote controller, or the like that is a separate entity from the information processing device 200 to establish communication between the computer, the remote controller, or the like and the information processing device 200

The first sound storage unit 231 stores sound that has been received by the information processing device data reception unit 211 and has been acquired by the audio device 100. The sound recorded by the first sound storage unit 231 can be used as recorded sound for the re-listening reproduction and the like. Information such as the sound recorded in the first sound storage unit 231 may be recorded in the second sound storage unit 233 in parallel therewith. In this case, the second sound storage unit 233 may be used for the re-listening reproduction and the like instead of the first sound storage unit 231. For example, the first sound storage unit 231 may be a volatile memory while the second sound storage unit 233 may be a nonvolatile memory or a hard disk drive.

In addition, all information related to recorded sound, a sound feature amount, or time stamp recording in the first sound storage unit 231 or the second sound storage unit 233 may be accumulated and recorded as long as the capacity thereof permits, or only the latest information corresponding to a predetermined time length may be recorded. Since the former recording method accumulates information corresponding to a longer time, it is possible to enhance a degree of freedom in chasing reproduction. According to the latter recording method, it is possible to save the capacity of the storage unit used and not to unnecessarily hold information in consideration that the recorded information is information related to privacy of other persons.

(2) Applied Configuration

Next, a configuration example of a hearing-aid system that is achieved by further adding functions to the hearing-aid system with the minimum configuration illustrated in FIG. 1 as a base will be described on the basis of FIG. 2. The hearing-aid system illustrated in FIG. 2 includes a sound analysis function, a noise cancellation function, and the like in addition to the hearing-aid function and the re-listening reproduction function that are minimum functions. Hereinafter, the functions newly added to the hearing-aid system with the first-time configuration illustrated in FIG. 1 will be mainly described, and description of the same functional configuration as that of the hearing-aid system in FIG. 1 will be omitted.
(Audio Device)

Figure 2:
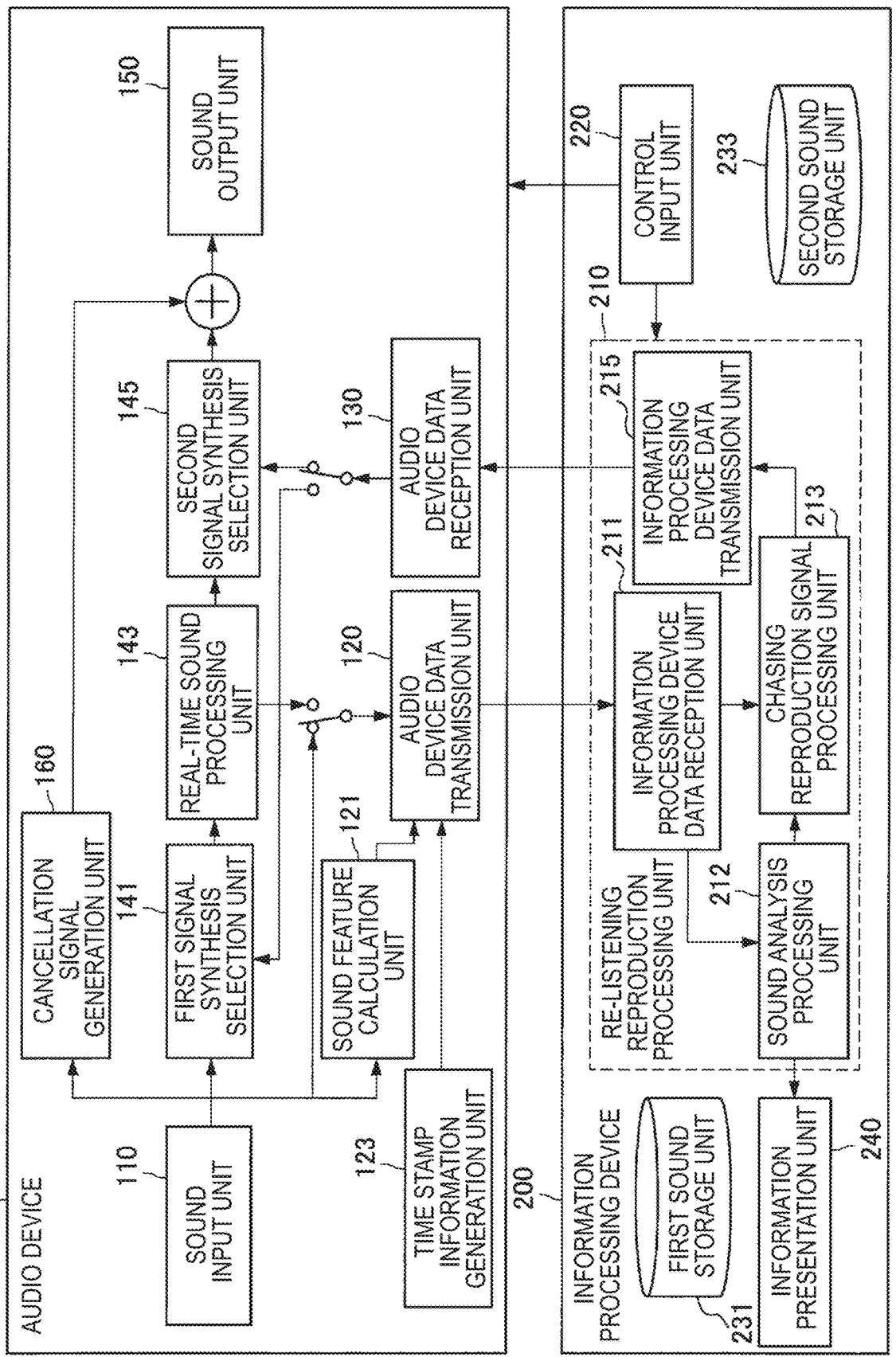
FIG. 2 is a functional block diagram illustrating another functional configuration of the hearing-aid system according to the embodiment.

As illustrated in FIG. 2, the audio device 100 includes the sound input unit 110, the audio device data transmission unit 120, the audio device data reception unit 130, and the sound output unit 150 in the similar manner to that in the audio device 100 illustrated in FIG. 1. Further, the audio device 100 in FIG. 2 includes a sound feature calculation unit 121, a time stamp information generation unit 123, a first signal synthesis selection unit 141, a real-time sound processing unit 143, a second signal synthesis selection unit 145, and a cancellation signal generation unit 160.

The sound input unit 110 is a sound monitor unit that acquires external sound and is configured in a similar manner to that in the sound input unit 110 in FIG. 1. The sound input unit 110 converts a surrounding audio signal into digital waveform data and outputs the digital waveform data to the sound feature calculation unit 121, the first signal synthesis selection unit 141, and the cancellation signal generation unit 160. In addition, the converted digital signal is also output to the audio device data transmission unit 120 in response to an instruction from the control input unit 220.

The sound feature calculation unit 121 calculates a sound feature amount necessary for operations of the chasing reproduction signal processing unit 213 or the sound analysis processing unit 212 of the information processing device 200 from the waveform data input from the sound input unit 110. The sound feature calculation unit 121 calculates, as the sound feature amount, an amplitude ratio and a phase difference per specific time between the respective microphones, for example. The sound feature amount calculated by the sound feature calculation unit 121 is output to the audio device data transmission unit 120.

The time stamp information generation unit 123 generates time stamp information to be applied to data that is transmitted to the information processing device 200 by the audio device data transmission unit 120 in response to an input from the control input unit 220. The time stamp information generation unit 123 generates the time stamp information to be applied to a time section of a digital signal to be transmitted, for example, in a case in which there is an operation of not transmitting a digital signal of a no-sound time section to the information processing device 200, or the like. The time stamp information generated by the time stamp information generation unit 123 is transmitted to the audio device data transmission unit 120. This is a method for solving a problem that information about which time a continually sent signal corresponds to is lost and it is not possible to perform re-listening by tracking back a predetermined time in the information processing device 200 in a case in which the operation of not transmitting the digital signal of the no-sound time section to the information processing device 200 is performed or the like as described above.

The audio device data transmission unit 120 outputs a digital signal input from the sound input unit 110 in a similar manner to that in FIG. 1. The digital signal may be transmitted through wired transmission or wireless transmission. In a case of the wireless transmission, for example, the transmission can be implemented by Bluetooth (registered trademark) or the like. In addition, the audio device data transmission unit 120 can also transmit the output from the real-time sound processing unit 143, which will be described later, instead of the sound signal input from the sound input unit 110 and can also dynamically change the output signal.

In addition, the audio device data transmission unit 120 according to the embodiment can also compress information of the sound feature amount calculated by the sound feature calculation unit 121 and transmit the information along with the sound waveform data to the information processing device 200. At this time, the audio device data transmission unit 120 performs simple bit depth conversion and then transmits the sound feature amount. In addition, in a case in which the sound data is respectively acquired by a plurality of microphones, the audio device data transmission unit 120 may extract only an input from a predetermined microphone, perform encoding processing thereon by sub-band codec (SBC), encode, decode, and then transmit the information.

For example, the audio device data transmission unit 120 may sample a signal derived from an input of one microphone of a sound monitor for the left ear with 8 kHz, pack the sound waveform data encoded by SBC and the sound feature amount data after simple bit depth conversion for each conversion length frame and transmit the packed data. At this time, the transmission data may be transmitted by a serial port profile (SPP) on the basis of a defined unique protocol. In addition, the encoding and decoding scheme can be arbitrarily selected, and an advanced audio distribution profile (A2DP), a headset profile (HSP), a hands-free profile (HFP), or the like may be provided in the system as in FIG. 1 that does not use the sound feature amount, for example. The data may be transmitted by the unique protocol encoding scheme using SPP, A2DP, HSP, or HFP.

The sound feature calculation unit 121 functions to secure functionalities of the sound analysis processing unit 212 and the chasing reproduction signal processing unit 213 while reducing the amount of data transmitted and received between the audio device 100 and the information processing device 200. For example, since irreversible coding is used for transmitting and receiving data, and a channel and a band for sending the data are limited in the description in the previous paragraphs, the data transmitted from the audio device data transmission unit 120 to the information processing device data reception unit 211 is the original sound waveform data from which a part of information has been lost. Therefore, processing that can be implemented by the sound analysis processing unit 212 and the chasing reproduction signal processing unit 213 using this waveform data is limited. For example, such an event that it is not possible to calculate the feature amount requiring input sound waveforms of both the ears and the feature amount using high-frequency information lost due to the band limitation and the like occur. Thus, in a case in which there is a feature amount that has to be calculated by using the original waveform data in feature amounts necessary for the processing on the side of the information processing device 200, it is possible to implement a desired function by the sound feature calculation unit 121 calculating the feature amount and transmitting the feature amount to the information processing device 200.

Further, the audio device data transmission unit 120 can also choose not to transmit the data in a case in which no human voice is included in current input sound, for example, on the basis of sound feature amount data calculated by the sound feature calculation unit 121. In this case, time stamp information of the time section of the transmitted sound waveform data is transmitted to the information processing device data reception unit 211 along with the sound waveform data transmitted from the audio device data transmission unit 120 to the information processing device data reception unit 211. The sound feature calculation unit 121 in this case functions to further reduce the amount of data transmitted and received between the audio device 100 and the information processing device 200 unlike the description in the previous paragraphs.

The audio device data reception unit 130 receives the encoded re-listening sound streaming data received from the information processing device 200. The audio device data reception unit 130 decodes the received streaming data to waveform data (such as PCM) on which signal processing can be performed and outputs the waveform data to the first signal synthesis selection unit 141 or the second signal synthesis selection unit 145. Alternatively, it is also possible to dynamically select which of the first signal synthesis selection unit 141 and the second signal synthesis selection unit 145 the input is to be provided, in accordance with the input from the control input unit 200. In a case in which the audio device 100 and the information processing device 20 are configured to be separate from each other as in the hearing-aid system according to the embodiment, antennas or the like for the encoding, the decoding, and the wireless transmission are needed, and a configuration in which a part of these antennas are included in the same device can be employed. In this case, exchange of data between blocks in the same device can be implemented by simple data exchange using a shared memory without compressing and expanding data.

The first signal synthesis selection unit 141 and the second signal synthesis selection unit 145 perform processing of generating the sound signal output from the sound output unit 150 in response to the input of the control input unit 220 and output the sound signal to the sound output unit 150. The input signal from the audio device data reception unit 130 to only any one of the first signal synthesis selection unit 141 or the second signal synthesis selection unit 145 is effective, and the input signal to the other is output without any change.

Specifically, the first signal synthesis selection unit 141 and the second signal synthesis selection unit 145 perform processing on real-time sound and re-listening sound, respectively, in response to the input from the control input unit 220, synthesize the sound, and output the synthesized sound to the sound output unit 150. In a case in which only the real-time sound is reproduced, for example, an output signal is obtained by multiplying the real-time sound by "1," multiplying the re-listening sound by "0," and taking the sum thereof. In addition, in a case in which only the re-listening sound is reproduced, the output signal is obtained by multiplying the real-time sound by "0," multiplying the re-listening sound by "1," and taking the sum thereof. Further, the output signal may be obtained by performing separate processing on the real-time sound and the re-listening sound and superimposing both the real-time sound and the re-listening sound.

The real-time sound processing unit 143 is a sound processing unit that performs signal processing with low delay on the sound obtained from the sound input unit 110 in the similar manner to the general sound monitor. The real-time sound processing unit 143 executes, for example, beam forming processing by multiple microphones, feedback cancellation or suppression processing, stationary/non-stationary noise suppression, sound amplification, equalizing, processing performed by a compressor or the like, and a user can listen to the output in real time.

The sound output unit 150 is an output unit that provides sound to a user and includes, for example, a D/A converter, a driver unit, or the like. The sound output unit 150 converts sound digital data, on which processing has been performed by the first signal synthesis selection unit 141 and the second signal synthesis selection unit 145, into an audio signal and outputs the audio signal.

The cancellation signal generation unit 160 performs signal processing to implement a noise cancellation function. The cancellation signal generation unit 160 generates a cancellation signal that cancels sound that leaks from the outside and reaches eardrums even if the sound monitor is mounted. The generated cancellation signal is synthesized with the output from the real-time sound processing unit 143 and is then output from the sound output unit 150.

In addition, the sound input unit 110, the real-time sound processing unit 143, and the sound output unit 150 in the audio device 100 may perform independent operations for each of the left and right ears or may perform non-independent operations.

(Information Processing Device)

The information processing device 200 is a device provided with an information processing function, and for example, is an information processing terminal or the like, such as a smartphone, capable of pairing with the audio device 100. The information processing device 200 includes the re-listening reproduction processing unit 210, the control input unit 220, the first sound storage unit 231, and the second sound storage unit 233 as illustrated in FIG. 2. Further, the information processing device 200 according to the embodiment includes an information presentation unit 240.

The re-listening reproduction processing unit 210 is a functional unit that performs processing for reproduction of recorded re-listening sound and includes an information processing device data reception unit 211, a sound analysis processing unit 212, a chasing reproduction signal processing unit 213, and an information processing device data transmission unit 215 as illustrated in FIG. 2.

The information processing device data reception unit 211 receives a data stream from the audio device data transmission unit 120, decodes encoded data, and acquires sound waveform data. The information processing device data reception unit 211 outputs the acquired sound waveform data to the sound analysis processing unit 212 and the chasing reproduction signal processing unit 213.

The sound analysis processing unit 212 analyzes the sound feature amount and the sound waveform data input from the information processing device data reception unit 211 and extracts information necessary for chasing reproduction signal processing and presentation of the information to a user. As the analysis for the chasing reproduction signal processing, the sound analysis processing unit 212 may extract information by calculating power of a signal and an autocorrelation coefficient in a specific time from the waveform data, for example, and applying a low pass filter. Then, the sound analysis processing unit 212 may regard a time as a "sound present section" when the values of the both exceed threshold values in a predetermined time and output the information to the chasing reproduction signal processing unit 213.

In addition, as analysis for the presentation of information, the sound analysis processing unit 212 may extract the information by taking a temporary difference in the sound feature amount (an amplitude ratio and a phase difference between microphones) calculated by the sound feature calculation unit 121, for example, and applying the low pass filter. Then, the sound analysis processing unit 212 may regard a position at which the value exceeds a certain threshold value as "a change point of a human speaker" and output the information to the information presentation unit

240. In addition, if a case in which the information processing device 200 is a smartphone and a sound waveform is displayed on a display that is an information presentation unit 240 is considered as another specific example, processing for displaying the waveform with high visibility in a limited display area on the display can be performed by the sound analysis processing unit 212. At this time, the sound analysis processing unit 212 may display, with vertical lines, ranges of the maximum value and the minimum value for several samples (for example, 005 sec), rather than displaying the sample value itself, after a band pass filter to pick up a waveform only in a sound band of humans from the sound waveform data, for example, is applied. In this manner, it is possible to present the sound waveform data to a user in a manner in which the sound waveform data is easily understood.

The chasing reproduction signal processing unit 213 analyzes sound data input from the information processing device data reception unit 211 and performs processing to output sound from the time tracking back a predetermined time in accordance with an input from the control input unit 220. In addition, the sound signal that reaches a user's ears after signal processing is performed thereon by the chasing reproduction signal processing unit 213 will be referred to as "re-listening sound" below. Meanwhile, the sound signal that reaches a user's ears without the signal processing performed by the chasing reproduction signal processing unit 213 will be referred to as "real-time sound". The chasing reproduction signal processing unit 213 can shorten the time of the re-listening sound and reproduce the re-listening sound in response to the input from the control input unit 220. For example, at least a part of the re-listening sound may be reproduced at a faster reproduction speed than the unmultiplied speed. The processing may, for example, apply a technology of performing reproduction while increasing a speech speed without changing a sound pitch thereof (see Non-Patent Literature 1, for example). The chasing reproduction signal processing unit 213 outputs the generated reproduction signal to the information processing device data transmission unit 215.

In addition, as another time-shortened reproduction method, a time section in which no human voice is present or no-sound section may be automatically detected as a skip target section, and reproduction may be performed while skipping at least a part of the skip target section. For the detection of the skip target section, determination may be made on the basis that a time section during which a sound volume level does not exceed a predetermined threshold value continues for a predetermined time or longer is skipped, for example. In addition, it is also possible to simultaneously perform the shortening by changing the reproduction speed and the time-shortening by the skip reproduction.

The information processing device data transmission unit 215 encodes the sound on which the chasing reproduction signal processing unit 213 has performed processing and transmits the sound to the audio device 100.

The control input unit 220 controls the functions of the audio device 100 and the information processing device 200 in response to operation inputs from a user. For example, the control input unit 220 causes execution of the re-listening reproduction function or causes completion of the re-listening reproduction function on the basis of an operation input from a user. In addition, the control input unit 220 performs various setting for a sound volume and the like of the audio device 100 on the basis of an operation input from a user. In addition, the device that is directly operated by a user is not limited to the information processing device 200 although not illustrated in the drawing. For example, it is also assumed that a user input is provided to the control input unit 220 by the user operating a computer, a remote controller, or the like that is a separate entity from the information processing device 200 to establish communication between the computer, the remote controller, or the like and the information processing device 200

The first sound storage unit 231 stores the sound which has been received by the information processing device data reception unit 211 and has been acquired by the audio device 100. At this time, the sound feature amount and the time stamp information may be stored together in the first sound storage unit 231. The sound recorded in the first sound storage unit 231 can be used as recorded sound in the re-listening reproduction. The information such as the sound recorded in the first sound storage unit 231 may be recorded in the second sound storage unit 233 in parallel therewith. In this case, the second sound storage unit 233 may be used in the re-listening reproduction or the like instead of the first sound storage unit 231. For example, the first sound storage unit 231 may be a volatile memory while the second sound storage unit 233 may be a nonvolatile memory or a hard disk drive.

In addition, all information related to recorded sound, a sound feature amount, or time stamp recording in the first sound storage unit 231 or the second sound storage unit 233 may be accumulated and recorded as long as the capacity thereof permits, or only the latest information corresponding to a predetermined time length may be recorded. Since the former recording method accumulates information corresponding to a longer time, it is possible to enhance a degree of freedom in chasing reproduction. According to the latter recording method, it is possible to save the capacity of the storage unit used and not to unnecessarily hold information in consideration that the recorded information is information related to privacy of other persons.

The information presentation unit 240 is a functional unit that displays a still image, a moving image, letter information, and the like on the basis of the information input from the sound analysis processing unit 212 and, for example, is a display or the like. In addition, the information presentation unit 240 includes not only the display itself but also a display processing unit that causes the display to display information. In addition, the information presentation unit 240 is not necessarily integrated with the information processing device 200 although not illustrated in the drawing. That is, the information presentation unit 240 may be incorporated in a device that is physically separated from the information processing device 200, receive the still image, the moving image, the letter information, and the like to be presented through a moving image, sound information, and the like through wired or wireless communication, and present the still image, the moving image, the letter information and the like to a user. The information presentation unit 240 that is physically separated from the information processing device 200 as described above includes, for example, a television, a tablet terminal, a PC, or the like.

Figure 3:
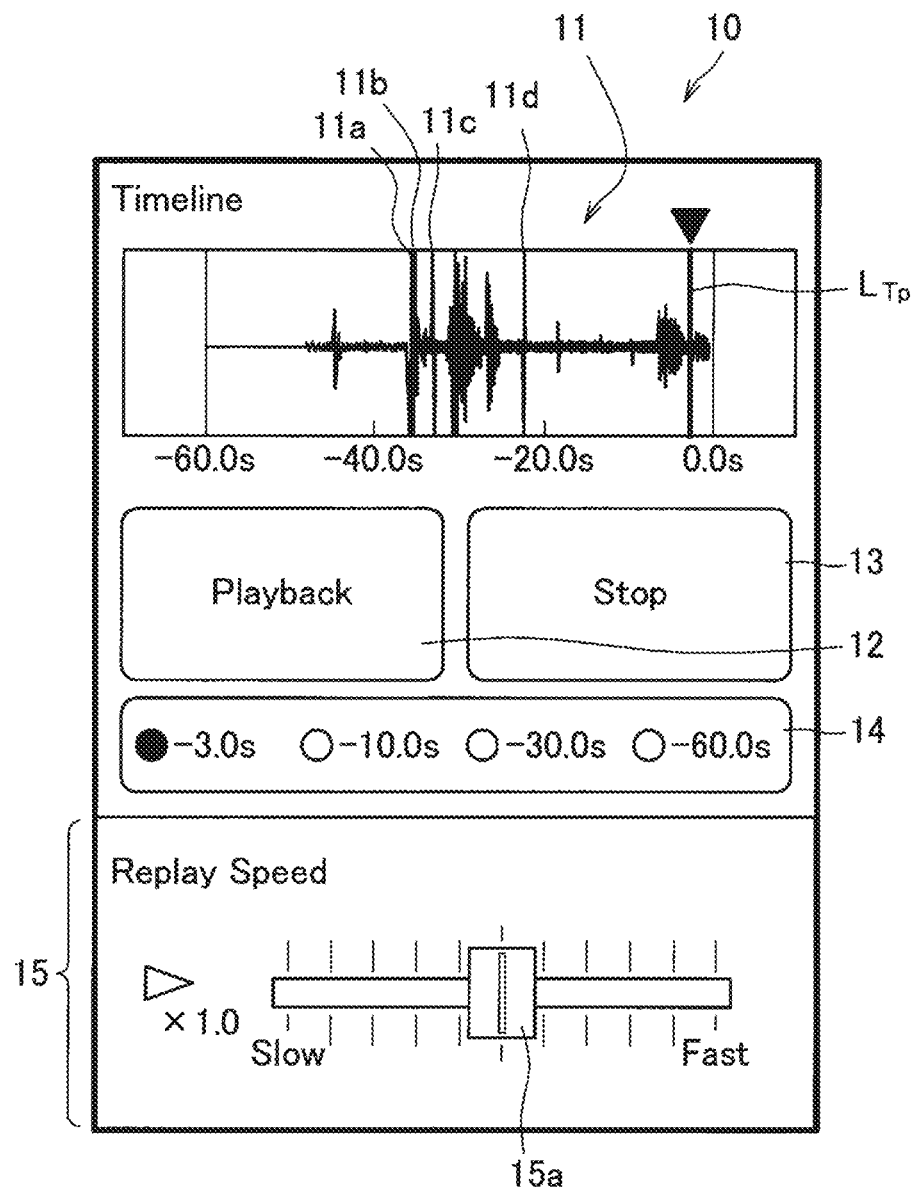
FIG. 3 is an explanatory diagram illustrating a re-listening reproduction screen as a display example of an information presentation unit according to the embodiment.

Here, FIG. 3 illustrates a re-listening reproduction screen 10 as a display example of the information presentation unit 240 according to the embodiment. The re-listening reproduction screen 10 is a screen for performing various kinds of setting for the re-listening reproduction function. In addition, the re-listening reproduction screen 10 is not limited to the configuration illustrated in FIG. 3 and can be appropriately changed.

A timeline display area 11 that displays, as an image, the sound waveform data that has been obtained by buffering the data in a past predetermined time (for example, 60 seconds) and has been input from the sound analysis processing unit 212 may be displayed on the re-listening reproduction screen 10. Lines (for example, lines 11a to 11d) that section a start position and a completion position of a speech section may be displayed at positions corresponding to times of change points of a speaker, which has been analyzed by the sound analysis processing unit 212, for example. Further, a line $L_{Tp}$ indicating a current re-listening reproduction position may be displayed in a sound waveform data image. For example, in a case in which the information presentation unit 240 includes a touch sensor or the like so as to be able to directly operate information displayed in the information presentation unit 240 with a finger or the like, the re-listening reproduction position can also be changed by changing the position of this line $L_{Tp}$ on the time axis.

Further, the re-listening reproduction screen 10 may present information indicating a current operation status of the chasing reproduction signal processing unit 213. For example, how long before (for example, how many seconds before) the present time the sound that is currently output by the chasing reproduction signal processing unit 213 and is heard by a user through the audio device 100 is may be displayed. In addition, a re-listening reproduction start button (Playback button) 12, the re-listening reproduction completion button (Stop button) 13, and a re-listening position setting unit 14 may be provided in the re-listening reproduction screen 10 as illustrated in FIG. 3. It is possible to start the re-listening reproduction processing if the re-listening reproduction start button 12 is pressed, and it is possible to complete the re-listening reproduction processing if the re-listening reproduction completion button 13 is pressed. In addition, the re-listening position setting unit 14 can set how long the time is to be tracked back from the re-listening reproduction start time to reproduce the recorded sound. In the example illustrated in FIG. 3, the sound is reproduced from a time tracking back three seconds from the re-listening reproduction start time.

In addition, the re-listening reproduction screen 10 can also include a speech speed adjustment unit 15 that sets a reproduction speed in the re-listening reproduction processing. In the example in FIG. 3, the reproduction speed in the re-listening reproduction processing can be increased or decreased by sliding a knob portion 15a. In addition, it is also possible to change the reproduction speed in a plurality of divided sections in the re-listening reproduction processing, and in the case, speech speed adjustment units 15 may be provided to correspond to the number of sections in which the reproduction speed can be set. In addition, the reproduction speed may be able to be set by inputting a numerical value, such as a "1.5-time speed", for example, in addition to the example in FIG. 3, and an icon, letters, or the like indicating that a skip mode is set may be displayed in a case in which the skip mode in which non-sound sections are skipped is set.

[1.2. Re-Listening Reproduction Processing]

Hereinafter, two cases will be described for the re-listening reproduction processing by the hearing-aid system according to the embodiment. In the following two cases, the description will be given on the assumption that the time tracking back from the re-listening start position is set in advance such that "sound in the past five seconds from the present is re-listened to", and a simultaneous hearing of the real-time sound and the re-listening sound is not performed. In addition, the description will be given by using an example in which reproduction is performed at a faster speed than the unmultiplied speed as a time-shortened reproduction method performed by the chasing reproduction signal processing unit 213.

Figure 4:
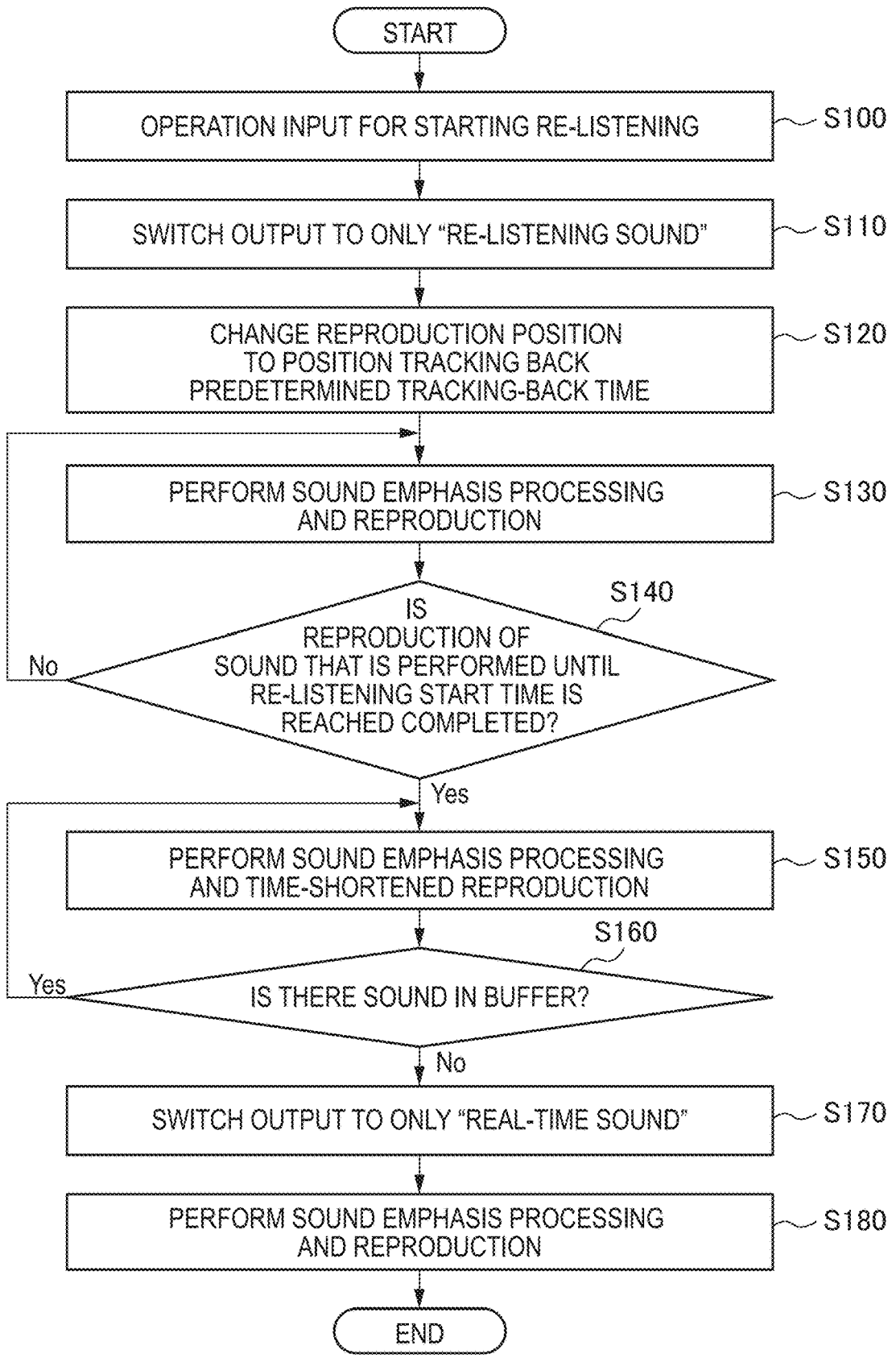
FIG. 4 is a flowchart illustrating an example of re-listening reproduction processing performed by the hearing-aid system according to the embodiment.

(1) Case in which Only Instruction for Starting Re-Listening Reproduction is Provided First, the re-listening reproduction processing performed by the hearing-aid system according to the embodiment will be described on the basis of FIGS. 4 to 8. In addition, FIG. 4 is a flowchart illustrating the re-listening reproduction processing performed by the hearing-aid system according to the embodiment. FIGS. 5 to 8 are explanatory diagrams for explaining the re-listening reproduction processing performed by the hearing-aid system according to the embodiment. In addition, Tnow represents a position at a present time, and Tp represents a re-listening reproduction position in FIGS. 5 to 8. In addition, $T_1$ represents a time at which a re-listening reproduction operation is input, $T_2$ represents a time tracking back tracking-back time set from $T_1$ toward the past, and $T_3$ represents a time at which the re-listening reproduction position reaches the present time.

The flowchart of the re-listening reproduction processing illustrated in FIG. 4 illustrates a case in which only an instruction for starting the re-listening reproduction is provided. That is, the flowchart illustrates a case in which no operation is performed to move on to the reproduction of the real-time sound after there is an operation input for starting the re-listening reproduction.

In the re-listening reproduction processing performed by the hearing-aid system according to the embodiment, the control input unit 220 starts the re-listening reproduction processing by the re-listening reproduction processing unit 210 if a user inputs an operation for starting the re-listening reproduction (S100) first, as illustrated in FIG. 4. The operation for starting the re-listening reproduction may be an operation of pressing the re-listening reproduction start button 12 in the re-listening reproduction screen 10 illustrated in FIG. 3, for example. The control input unit 220 causes the re-listening reproduction processing unit 210 to start the re-listening reproduction processing and provides an instruction to the audio device 100 such that sound output from the sound output unit 150 is only the re-listening sound (S110). Then, the reproduction position is changed to a position tracking back a predetermined tracking-back time (S120), and reproduction of the re-listening sound after sound emphasis processing is started (S130). In addition, the sound emphasis processing is not necessarily performed in Step S130, and the re-listening sound may be reproduced without performing the sound emphasis processing.

Figure 5:
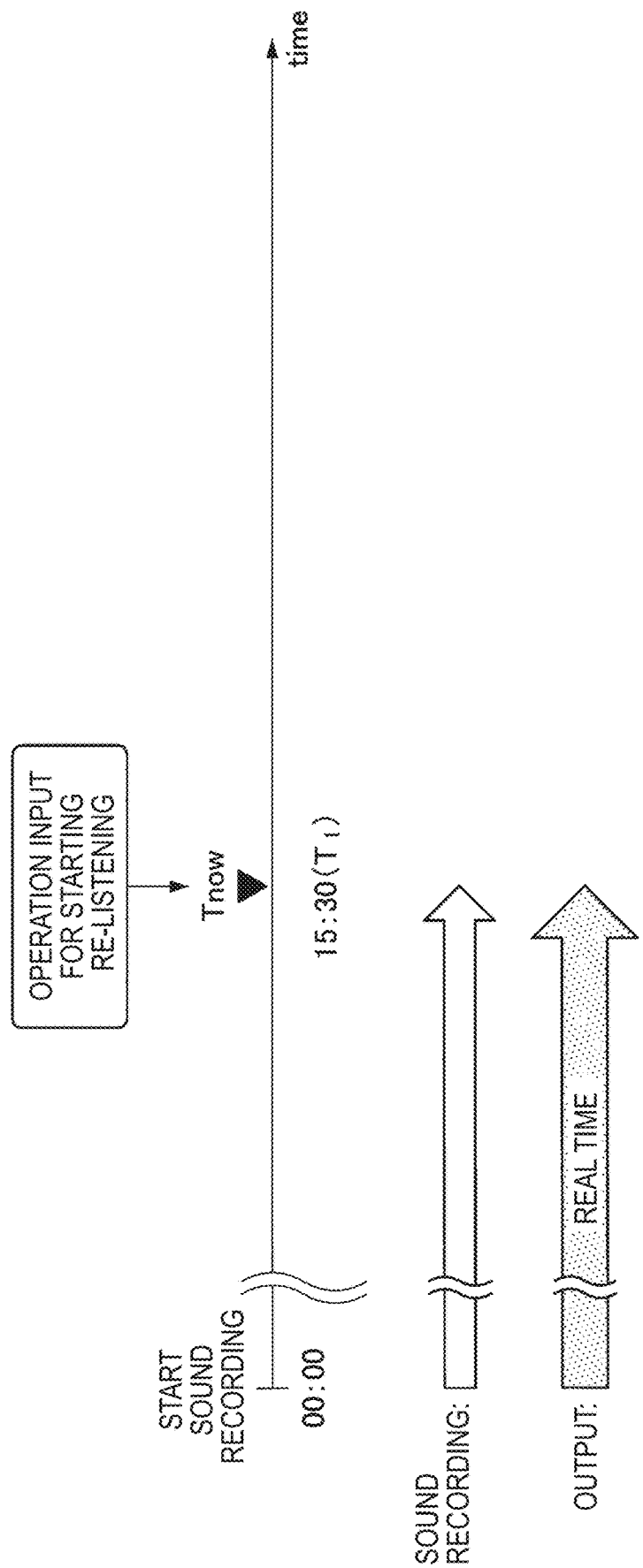
FIG. 5 is an explanatory diagram illustrating a reproduction state in Step S100 in FIG. 4.
Figure 6:
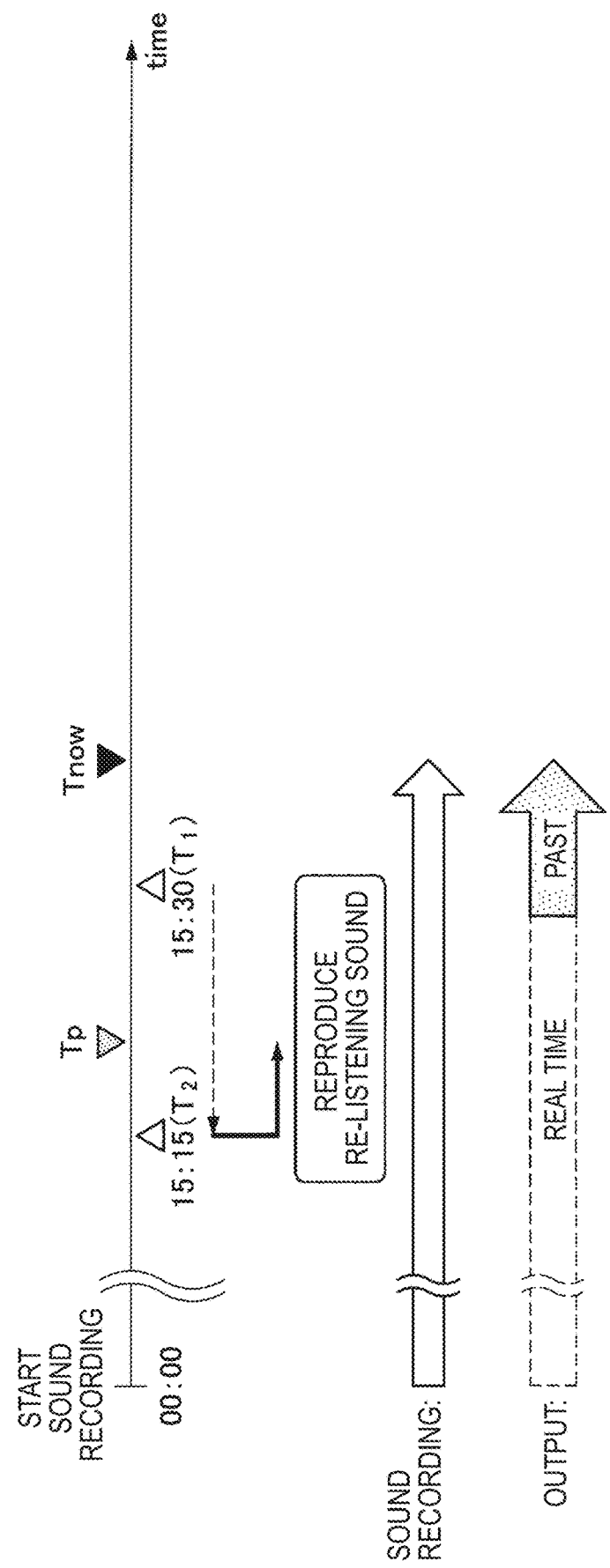
FIG. 6 is an explanatory diagram illustrating reproduction states in Steps S120 and S130 in FIG. 4.

As illustrated in FIG. 5, for example, the operation of starting the re-listening reproduction in Step S100 is assumed to be performed at a time after elapse of the time $T_1$ from the start of recording. The real-time sound is output to the user until the operation is performed, and the real-time sound is recorded in the first sound storage unit 231. After only the re-listening sound is output in Step S110 by the starting of the re-listening reproduction, the reproduction of the re-listening sound is started from the time $T_2$ tracking back a predetermined tracking-back time from the time $T_1$ as illustrated in FIG. 6 in Step S120. In the example in FIG. 6, the tracking-back time is set to fifteen seconds, and if the time $T_1$ at which the operation of starting the re-listening reproduction is performed is fifteen minutes and 30 seconds, for example, the re-listening sound is repeated from the position of the time $T_2$ tracking back fifteen seconds therefrom (that is, fifteen minutes and 15 seconds).

The re-listening sound is reproduced at a first reproduction speed in the section of the reproduction of the re-listening sound in Step S130. The first reproduction speed may be set in advance or may be set by the user. Since the user desires to check the content of the sound in the section again, the first reproduction speed is generally set to be a reproduction speed that is equal to or slower than the unmultiplied speed. It is a matter of course that the first reproduction speed may be set to a reproduction speed that is faster than the unmultiplied speed.

Returning to the description of FIG. 4, the reproduction of the re-listening sound in Step S130 is performed until the re-listening reproduction position Tp reaches the re-listening start time $T_1$ (S140). Then, if the re-listening reproduction position Tp reaches the re-listening start time $T_1$, the chasing reproduction signal processing unit 213 reproduces the re-listening sound at a second reproduction speed in a section from the position Tp to the present time position Tnow (S150). Since it is necessary to cause the re-listening reproduction position Tp to reach the present time in the section, the second reproduction speed is set to be a faster speed than the unmultiplied speed. Then, when there is no re-listening sound, which has been buffered and has not yet been reproduced, in the first sound storage unit 231 (S160), that is, when the re-listening reproduction position Tp reaches the present time position Tnow, the re-listening reproduction processing performed by the chasing reproduction signal processing unit 213 is completed. Then, the control input unit 220 provides an instruction such that the sound output from the sound output unit 150 to the audio device 100 is only the real-time sound (S170), and only the real-time sound after the sound emphasis processing by the real-time sound processing unit 143 is provided to the user (S180).

Figure 7:
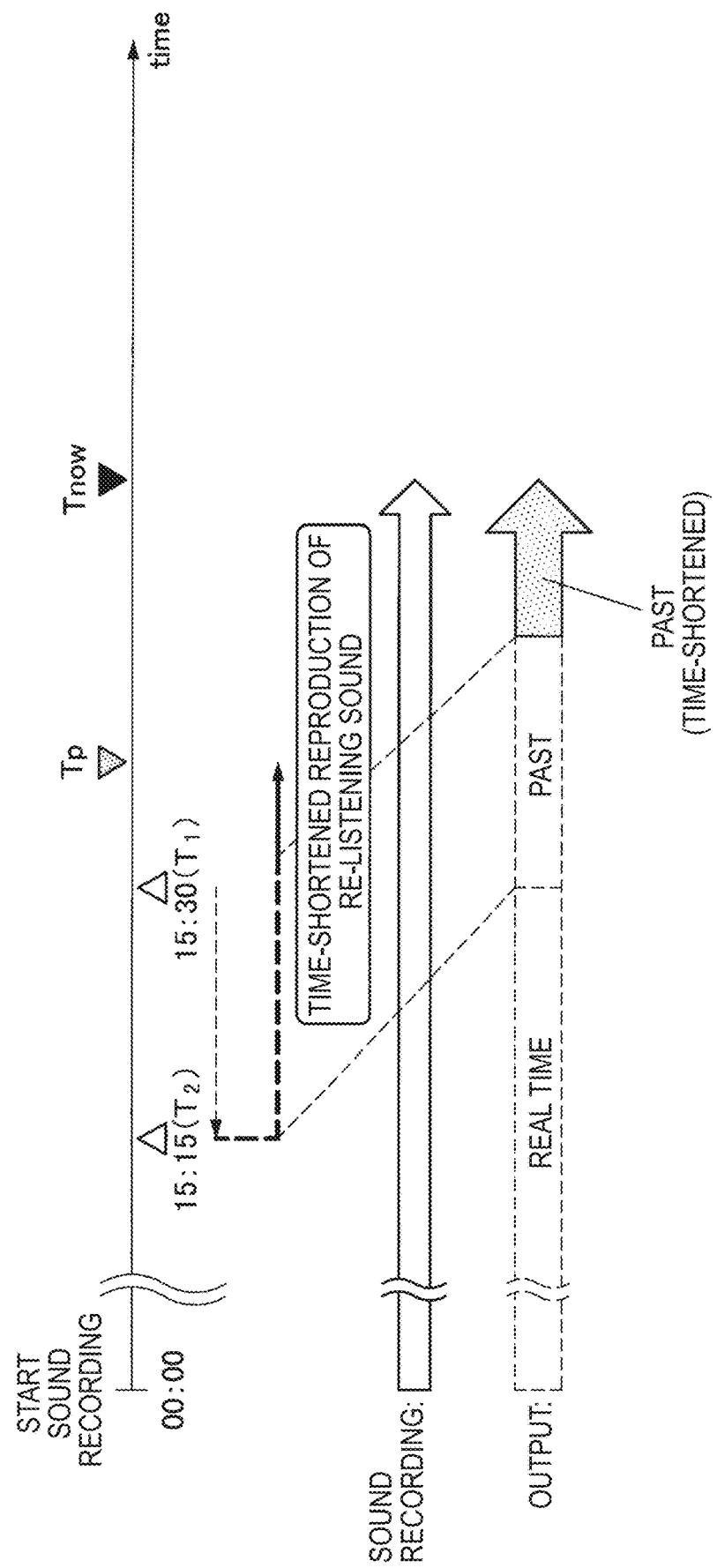
FIG. 7 is an explanatory diagram illustrating a reproduction state in Step S150 in FIG. 4.
Figure 8:
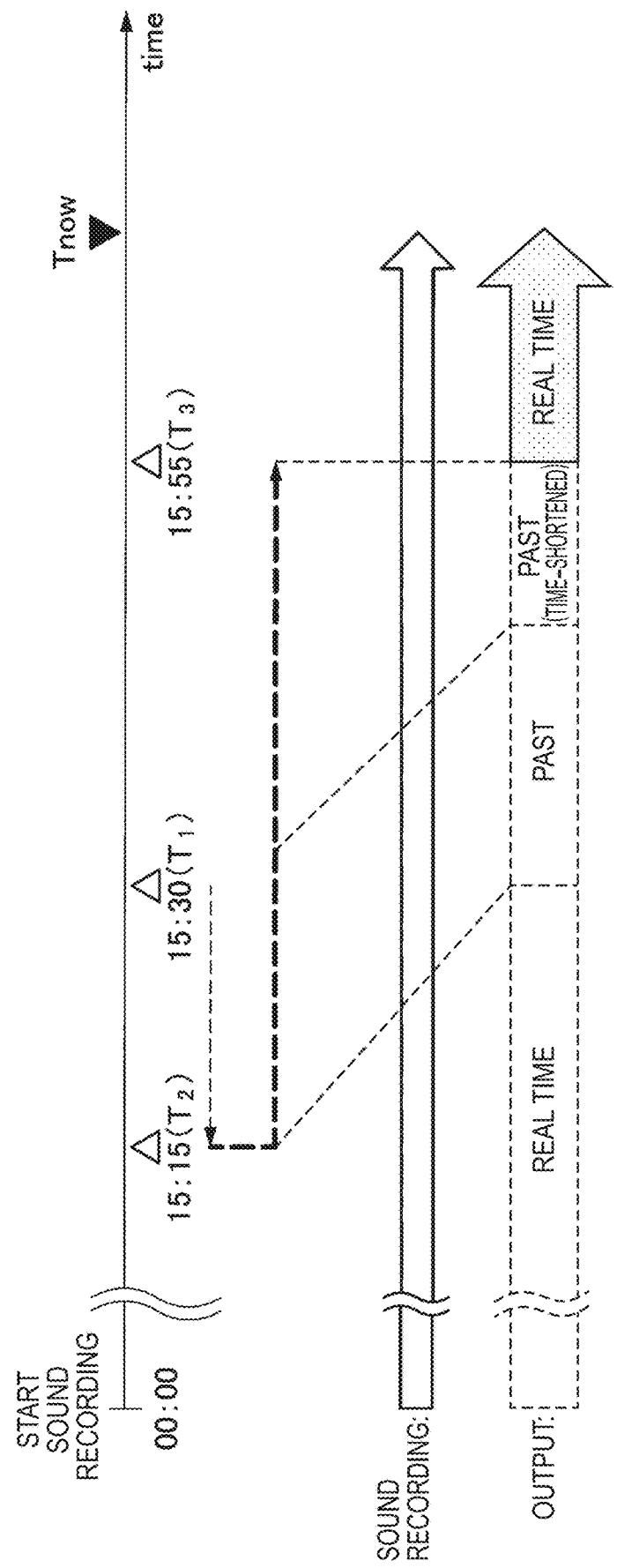
FIG. 8 is an explanatory diagram illustrating a reproduction state in Step S180 in FIG. 4.

FIG. 7 illustrates a reproduction state of the re-listening sound after the re-listening reproduction position Tp reaches the re-listening start time $T_1$. As illustrated in FIG. 7, the reproduction is performed at the second reproduction speed that is faster than the unmultiplied speed in the section in Step S150. Thereafter, if the re-listening reproduction position Tp reaches the present time position Tnow, the reproduction of the re-listening sound is completed, and only the real-time sound is output as illustrated in FIG. 8.

(2) Case in which there is Instruction for Completing Re-Listening Reproduction

Figure 9:
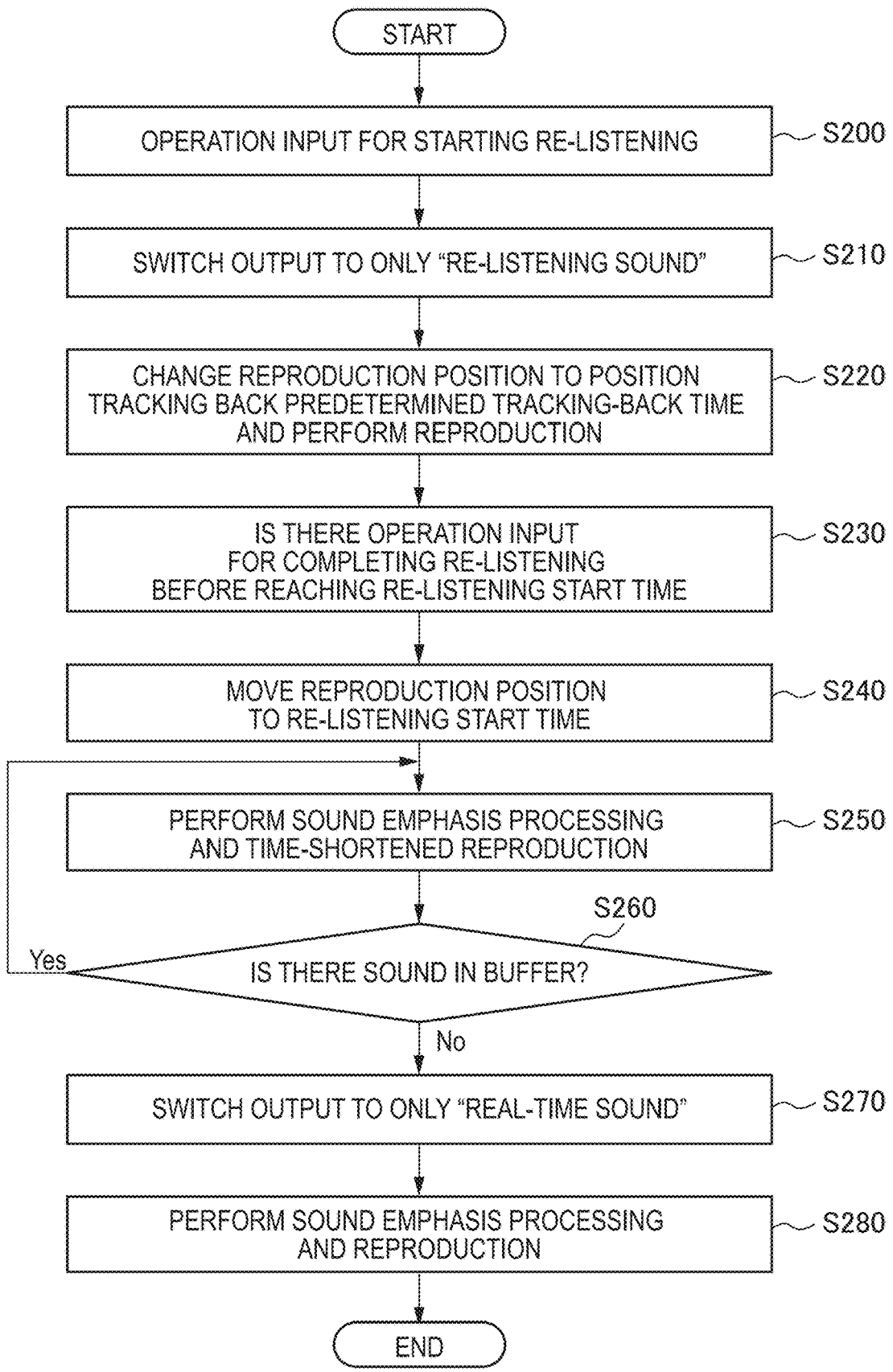
FIG. 9 is a flowchart illustrating another example of the re-listening reproduction processing performed by the hearing-aid system according to the embodiment.

Next, another case of the re-listening reproduction processing performed by the hearing-aid system according to the embodiment will be described on the basis of FIG. 9. In addition, FIG. 9 is a flowchart illustrating the re-listening reproduction processing in a case in which there is an instruction for completing the re-listening reproduction. That is, a case is shown in which, after there is an operation input for starting the re-listening reproduction, an operation input for completing the re-listening reproduction is received from a user to move on to the time-shortened reproduction of the re-listening sound and the reproduction of the real-time sound. Hereinafter, different processing from the re-listening reproduction processing illustrated in FIG. 4 will be mainly described, and detailed description of the same processing will be omitted.

In the re-listening reproduction processing performed by the hearing-aid system according to the embodiment, the control input unit 220 starts the re-listening reproduction processing by the re-listening reproduction processing unit 210 if an operation of starting the re-listening reproduction is input from a user (S200) first, as illustrated in FIG. 9. The control input unit 220 starts the re-listening reproduction processing by the re-listening reproduction processing unit 210 and provides an instruction to the audio device 100 such that the sound output from the sound output unit 150 is only the re-listening sound (S210). Then, the reproduction position is changed to a position tracking back a predetermined tracking-back time, and the reproduction of the re-listening sound after the sound emphasis processing is started (S220). Processing in Steps S200 to S220 is the same as the processing in Step S100 to S130 in FIG. 4. In addition, the sound emphasis processing is not necessarily performed in Step S220, and the re-listening sound may be reproduced without performing the sound emphasis processing.

Here, it is assumed that there is an operation input for completing the re-listening reproduction from the user during the reproduction of the re-listening sound in Step S220 until the re-listening reproduction position Tp reaches the re-listening start time $T_1$ (S230). The chasing reproduction signal processing unit 213 moves the re-listening reproduction position Tp to the re-listening start time $T_1$ in response to the operation input (S240) and reproduces the re-listening sound at the second reproduction speed in a section from the re-listening start time $T_1$ until the re-listening reproduction position Tp reaches the present time position Tnow (S250). Since it is necessary to cause the re-listening reproduction position Tp to reach the present time in the similar manner to that in Step S150 in FIG. 4 in this section, the second reproduction speed is set to be a faster speed than the unmultiplied speed.

Then, when there is no re-listening sound, which has been buffered and has not yet been reproduced, in the first sound storage unit 231 (S260), that is, when the re-listening reproduction position Tp reaches the present time position Tnow, the re-listening reproduction processing by the chasing reproduction signal processing unit 213 is completed. Then, the control input unit 220 provides an instruction to the audio device 100 such that the sound output from the sound output unit 150 is only the real-time sound (S270), and only the real-time sound after the sound emphasis processing performed by the real-time sound processing unit 143 is provided to the user. The processing in Step S250 to S280 is the same as the processing in Step S150 to S180 in FIG. 4. As described above, it is possible to hear the real-time sound during the re-listening reproduction processing in the section of Step S250 even in a case in which the user explicitly completes the re-listening reproduction processing.

Although the case in which there is an operation input for completing the re-listening reproduction from the user until the re-listening reproduction position Tp reaches the re-listening start time $T_1$ has been described in the example in FIG. 9, the user can perform the operation input for completing the re-listening reproduction even after the re-listening reproduction position Tp reaches the re-listening start time $T_1$. In this case, the chasing reproduction signal processing unit 213 may further increase the reproduction speed of the re-listening sound or may complete the reproduction of the re-listening sound itself, for example.

In addition, a case in which the user successively changes the re-listening reproduction position Tp is also considered, and in the case, the reproduction of the re-listening sound may be started by tracking back a predetermined time from a time at which the operation for starting the re-listening reproduction is input every time the input is made.

[1.3. Supplementary Note]

Since the hearing-aid system according to the embodiment can perform re-listening reproduction of an acquired sound signal, it is possible to execute sound processing of predicting the sound signal or processing that takes a computation time. As a result, it is possible to achieve sound emphasis with higher quality.

(1) Non-Stationary Noise Suppression Processing

For example, the hearing-aid system according to the embodiment can execute non-stationary noise suppression processing. For example, non-stationary noise of collision of some objects such as keyboard typing sound or door opening or closing is disagreeable to the ears and is a target to be suppressed. Meanwhile, since consonant parts of sound are important for hearing the sound, it is necessary to surely reproduce the parts. However, the consonant parts of sound and the non-stationary noise such as the collision noise as described above have a common feature that energy is instantaneously focused on a high frequency region, and it is difficult to distinguish the both merely by observing instantaneous signals.

Thus, it is possible to distinguish and remove sudden noise with satisfactory accuracy by the chasing reproduction signal processing unit 213 executing the non-stationary noise suppression processing to suppress the non-stationary noise such as the collision sound on the assumption that the signal has been buffered and is to be reproduced with a time delay to some extent. The signal processing technology described in Non-Patent Literature 2, for example, can be applied to the non-stationary noise suppression processing. Since the method described in Non-Patent Literature 2 uses, as clues, signals before and after a time section to be processed, it is difficult to perform the method by the real-time sound processing unit 143 due to a relatively large computation amount and necessary processing time. However, the re-listening reproduction processing of the hearing-aid system according to the embodiment can perform the non-stationary noise suppression processing since temporal restriction and computation cost are generous.

(2) Simultaneous Hearing of Re-Listening Sound and Real-Time Sound

In a case in which sound that is desired to be repeatedly heard is long, and a user himself/herself is required to respond in some way during the sound, it is preferable to provide a function of simultaneously hearing the re-listening sound and the real-time sound. Thus, the hearing-aid system according to the embodiment can implement the simultaneous hearing of the re-listening sound and the real-time sound while including the function of reproducing the re-listening sound.

The sound can be synthesized by the first signal synthesis selection unit 141 and the second signal synthesis selection unit 145. However, there is a possibility that it becomes difficult to hear both the re-listening sound and the real-time sound if both the sound is simply added to each other. Therefore, a sound signal of at least any one of the re-listening sound and the real-time sound may be processed such that the both can be easily discriminated from each other. Although the sound signal may be processed by the first signal synthesis selection unit 141 and the second signal synthesis selection unit 145, the chasing reproduction signal processing unit 213, which has less restriction of computation cost and less restriction of computation time, may process the re-listening sound.

Specifically, it is possible to process the re-listening sound to hear like a dry and vicinity sound as compared to the real-time sound by performing echo suppression processing described in Non-Patent Literature 3, for example. Alternatively, it is also possible to process the re-listening sound as if the sound were generated in an environment different from that of the real-time sound, by applying a head transfer function or a room impulse response (or something with equivalent effect) filter. The processing is assumed to include measures of localization in the head, making a sound source position unclear, and the like. Further, a pitch of the re-listening sound may be raised (or lowered), or an effect used for a voice changer may be applied to process the re-listening sound to be heard differently from the real-time sound by sound pitch conversion technology. In addition, voice quality of the re-listening sound can be converted by replacing a spectrum envelope, separation of pitch information, and a spectrum envelope, or sound pitch of the re-listening sound can be changed by replacing pitch information, according to the Vocoder technology that is one of so-called sound and synthesis technologies.

[1.4. Conclusion]

The configuration of the hearing-aid system according to the embodiment and the re-listening reproduction processing thereof have been described above. According to the embodiment, a user can immediately reproduce missing re-listening sound during conversation even if the user misses the sound, and can smoothly switch between reproduction of re-listening sound and ordinary reproduction (that is, listening of the real-time sound). In addition, the hearing-aid system according to the embodiment can provide re-listening sound that can be easily heard.

2. Second Embodiment

Next, a hearing-aid apparatus 300 according to a second embodiment of the present disclosure will be described on the basis of FIGS. 10 and 11. The hearing-aid apparatus 300 according to the embodiment has a configuration in which the hearing-aid system according to the first embodiment is organized in one device. Hereinafter, the minimum configuration of the hearing-aid apparatus 300 according to the embodiment and a configuration example in a case in which functions such as a noise cancellation function are added to the minimum configuration will be described. In addition, FIG. 10 corresponds to the configuration of the hearing-aid system according to the first embodiment illustrated in FIG. 1, and FIG. 11 corresponds to the configuration of the hearing-aid system according to the first embodiment illustrated in FIG. 2. Therefore, detailed description of the respective functions will be omitted.

(1) Minimum Configuration

First, a minimum functional configuration of the hearing-aid apparatus 300 according to the embodiment will be described on the basis of FIG. 10. The hearing-aid system illustrated in FIG. 10 is enabled to perform the re-listening reproduction function in addition to an ordinary hearing-aid function as minimum functions.

Figure 10:
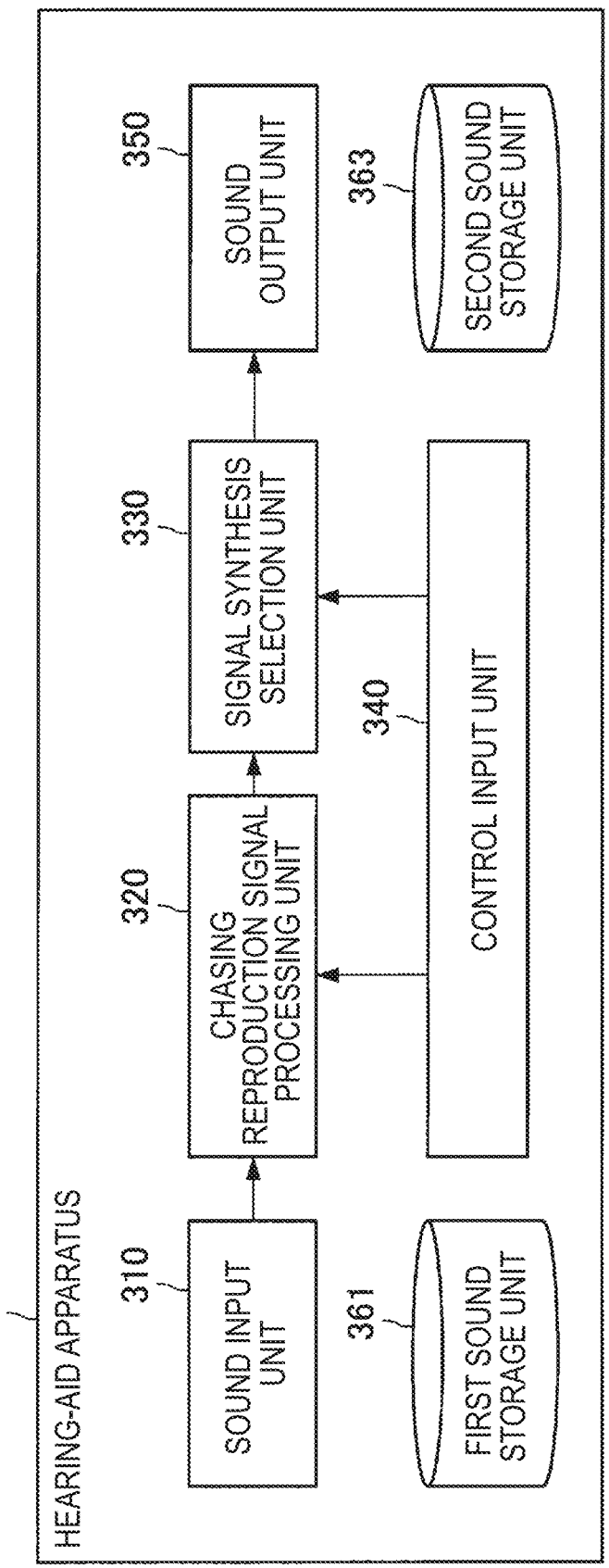
FIG. 10 is a functional block diagram illustrating a minimum functional configuration of a hearing-aid system according to a second embodiment of the present disclosure.

The hearing-aid apparatus 300 includes a sound input unit 310, a chasing reproduction signal processing unit 320, a signal synthesis selection unit 330, a control input unit 340, a sound output unit 350, a first sound storage unit 361, and a second sound storage unit 363 as illustrated in FIG. 10. In this hearing-aid apparatus 300, the functional unit that transmits and receives data between devices is omitted as compared with the hearing-aid system in FIG. 1. The sound input unit 310 corresponds to the sound input unit 110, and the chasing reproduction signal processing unit 320 corresponds to the chasing reproduction signal processing unit 213. In addition, the signal synthesis selection unit 330 corresponds to the signal synthesis selection unit 140, and the control input unit 340 corresponds to the control input unit 220. In addition, the sound output unit 350 corresponds to the sound output unit 150, the first sound storage unit 361 corresponds to the first sound storage unit 231, and the second sound storage unit 233 corresponds to the second sound storage unit 363. Since the functions of the respective functional units are similar to those in the first embodiment, detailed description will be omitted. One device that includes the re-listening reproduction function can be configured as described above.

(2) Applied Configuration

Next, a configuration example of a hearing-aid apparatus 300 that is achieved by further adding functions to the hearing-aid system with the minimum configuration illustrated in FIG. 10 as a base will be described on the basis of FIG. 11. The hearing-aid apparatus 300 illustrated in FIG. 11 includes a sound analysis function, a noise cancellation function, and the like in addition to the hearing-aid function and the re-listening reproduction function that are minimum functions. Hereinafter, the functions newly added to the hearing-aid system with the first-time configuration illustrated in FIG. 10 will be mainly described in comparison with the hearing-aid system according to the first embodiment illustrated in FIG. 2.

Figure 11:
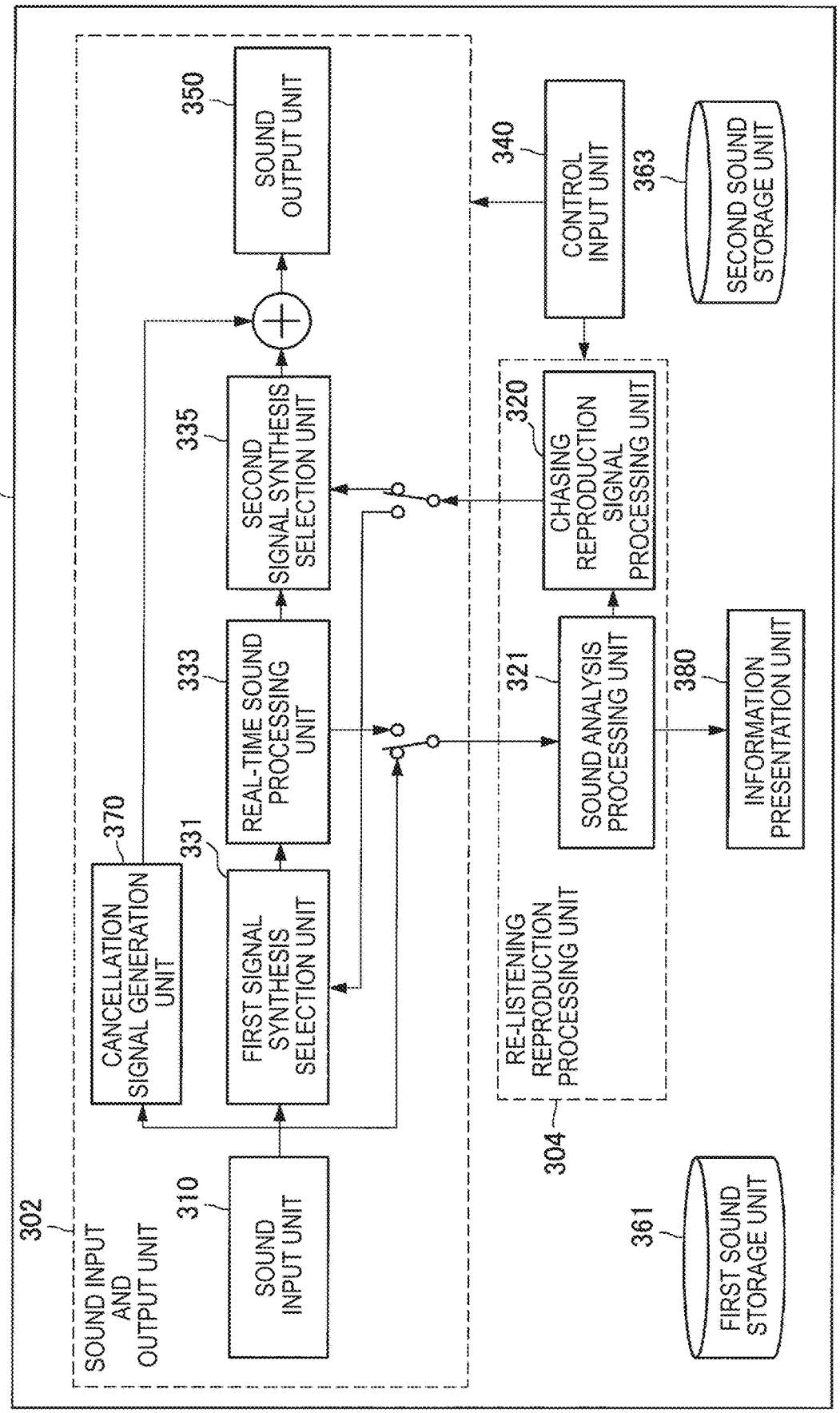
FIG. 11 is a functional block diagram illustrating another functional configuration of the hearing-aid system according to the embodiment.

The functions of the hearing-aid apparatus 300 can be roughly classified into a sound input and output unit 302 and a re-listening reproduction processing unit 304 as illustrated in FIG. 11. The sound input and output unit 302 is a processing unit that implements the function of the audio device 100 in the hearing-aid system in FIG. 2, and the re-listening reproduction processing unit 304 is a processing unit that implements the function of the information processing device 200 in the hearing-aid system in FIG. 2. The functional unit of transmitting and receiving data between devices is omitted from such a hearing-aid apparatus 300 as compared with the hearing-aid system in FIG. 2, in the similar manner to that in the hearing-aid apparatus 300 in FIG. 10.

That is, the sound input and output unit 302 includes a sound input unit 310, a first signal synthesis selection unit 331, a real-time sound processing unit 333, a second signal synthesis selection unit 335, and a cancellation signal generation unit 370. These components correspond to the sound input unit 110, the first signal synthesis selection unit 141, the real-time sound processing unit 143, the second signal synthesis selection unit 145, the sound output unit 150, and the cancellation signal generation unit 160 in the audio device 100 in FIG. 2, respectively.

In addition, the re-listening reproduction processing unit 304 includes a chasing reproduction signal processing unit 320 and a sound analysis processing unit 321. These correspond to the chasing reproduction signal processing unit 213 and the sound analysis processing unit 212 in the information processing device 200 in FIG. 2. In addition, the hearing-aid apparatus 300 includes a first sound storage unit 361, a second sound storage unit 363, and an information presentation unit 380. These correspond to the first sound storage unit 231, the second sound storage unit 233, and the information presentation unit 240 in the hearing-aid system in FIG. 2, respectively. Since the functions of the respective functional units are similar to those in the first embodiment, detailed description will be omitted. However, it is possible to configure a device that has the functions of the hearing-aid system in FIG. 2 as described above.

3. Hardware Configuration Examples

Figure 12:
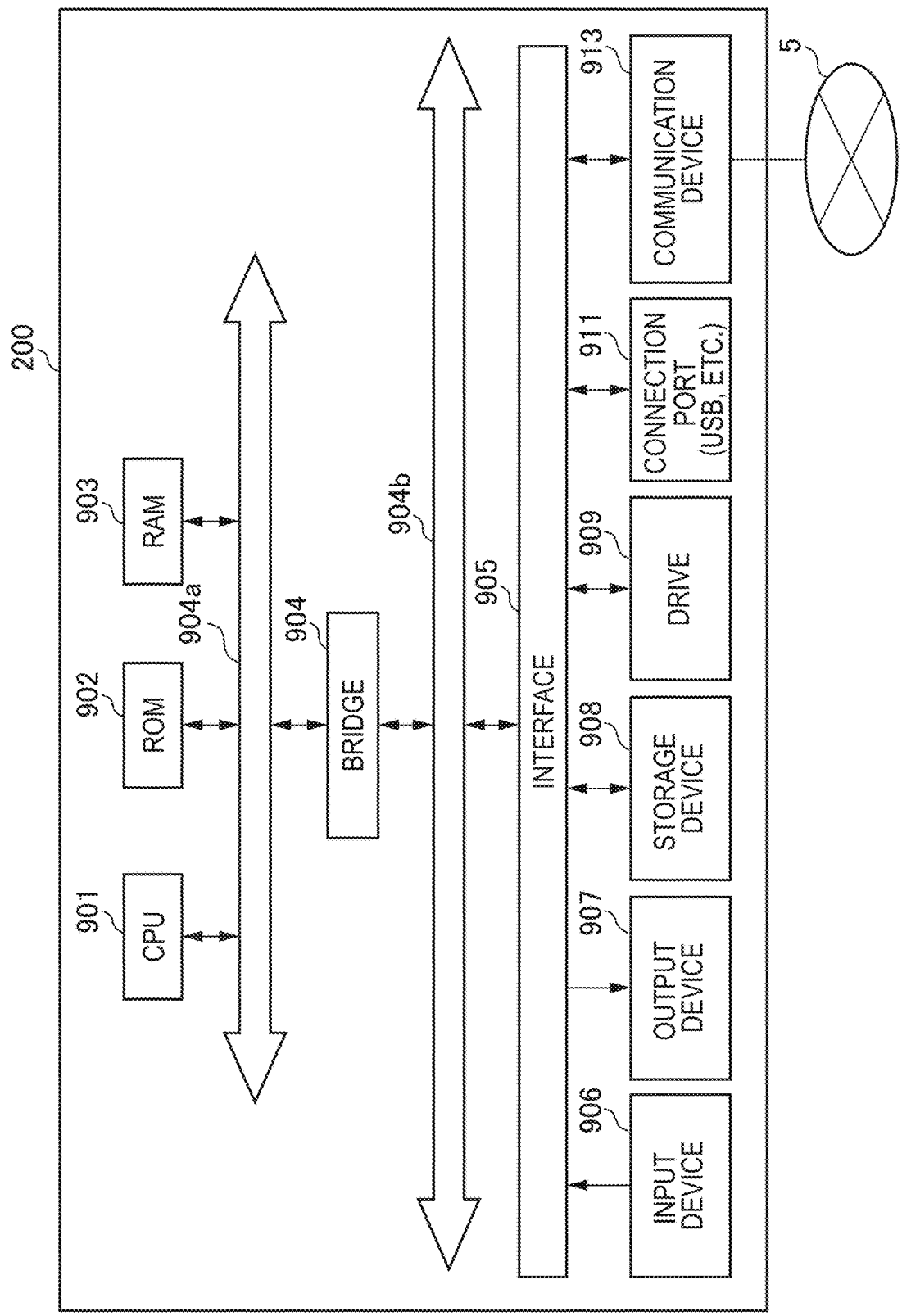
FIG. 12 is a hardware configuration diagram illustrating a hardware configuration of an information processing apparatus according to the embodiment.

At last, hardware configuration examples of the audio device 100, the information processing device 200, and the hearing-aid apparatus 300 according to the embodiment will be described. Since these devices can be configured in a similar manner, description will be given below by exemplifying the information processing device 200. FIG. 12 is a hardware configuration diagram illustrating the hardware configuration of the information processing device 200 according to the embodiment.

The information processing device 200 according to the present embodiment can be implemented as a processing device including a computer, as described above. As illustrated in FIG. 12, the information processing device 200 is configured to include a central processing unit (CPU) 901, a read only memory (ROM) 902, a random access memory (RAM) 903, and a host bus 904a. In addition, the information processing device 200 is configured to include a bridge 904, an external bus 904b, an interface 905, an input device 906, an output device 907, a storage device 908, a drive 909, a connection port 911, and a communication device 913.

The CPU 901 functions as an arithmetic processing device and a control device and controls the overall operation in the information processing device 200 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. These components are interconnected via the host bus 904a formed by a CPU bus or the like.

The host bus 904a is connected to the external bus 904b such as peripheral component interconnect/interface (PCI) bus through the bridge 904. Moreover, the host bus 904a, the bridge 904, and the external bus 904b are not necessarily configured as separate components, and the functions of them may be incorporated into a single bus.

The input device 906 is configured to include input means through which a user can input information, such as a mouse, a keyboard, a touch panel, a button, a microphone, a switch, a lever, an input control circuit that generates an input signal on the basis of the input by the user and outputs it to the CPU 901, and the like. The output device 907 includes, in one example, a display device such as a liquid crystal display (LCD) device, an organic light emitting diode (OLED) device, or a lamp, and a sound output device such as a speaker.

The storage device 908 is an example of the storage unit of the information processing device 200 and is a device for storing data. The storage device 908 may include a recording medium, a recording device that records data in the recording medium, a readout device that reads out data from the recording medium, a deletion device that deletes data recorded in the recording medium and the like. The storage device 908 drives a hard disk, and stores a program executed by the CPU 901 and various kinds of data.

The drive 909 is a reader-writer for a recording medium, and is built in the information processing device 200 or is externally attached thereto. The drive 909 reads out information recorded in a mounted magnetic disk, optical disk, magneto-optical disc, or removable recording medium such as a semiconductor memory, and outputs the information to the RAM 903.

The connection port 911 is an interface connected to an external device and is a port for connecting an external device that is capable of transmitting data through, in one example, a universal serial bus (USB). Furthermore, the communication device 913 is, in one example, a communication interface formed by a communication device or the like for connecting to a communication network 5. Furthermore, the communication device 913 may be a communication device compatible with a wireless local area network (LAN), a communication device compatible with a wireless USB, or a wired communication device that communicates with wire.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a reproduction processing unit that performs reproduction of a recorded sound on a basis of a reproduction start instruction for starting re-listening of the recorded sound from a position tracking back a predetermined time from a reproduction start time, at which the reproduction start instruction is input, to a position of a present time.

(2)
The information processing apparatus according to (1),
in which the reproduction processing unit reproduces the recorded sound at a first reproduction speed to a position of the reproduction start time and reproduces the recorded sound at a second reproduction speed from the position of the reproduction start time to the position of the present time.

(3)
The information processing apparatus according to (2),
in which, when a reproduction completion instruction of the recorded sound is input before a position of reproduction of the recorded sound reaches the reproduction start time, the reproduction processing unit moves the position of reproduction to the reproduction start time.

(4)
The information processing apparatus according to (2) or (3),
in which the second reproduction speed is equal to or faster than the first reproduction speed.

(5)
The information processing apparatus according to any one of (2) to (4),
in which the second reproduction speed is faster than an unmultiplied speed.

(6)
The information processing apparatus according to any one of (1) to (5),
in which the reproduction processing unit performs the reproduction by skipping at least a part of a section from the reproduction start time to the present time.

(7)
The information processing apparatus according to (6),
in which a target section to be skipped is a time section in which no human voice is present or a no-sound section.

(8)
The information processing apparatus according to any one of (1) to (7), further including:
a cancellation signal generation unit that executes a noise cancellation function at least during reproduction of the recorded sound.

(9)
The information processing apparatus according to any one of (1) to (8), including:
a sound analysis processing unit that analyzes the recorded sound,
in which the reproduction processing unit performs sound emphasis processing on a basis of an analysis result obtained by the sound analysis processing unit.

(10)
The information processing apparatus according to any one of (1) to (8), including:
a sound analysis processing unit that analyzes the recorded sound; and
an information presentation unit that presents information related to the sound on a basis of an analysis result obtained by the sound analysis processing unit.

(11)
The information processing apparatus according to (10),
in which the information presentation unit that causes a display to display a sound waveform of the acquired sound.

(12)
The information processing apparatus according to any one of (1) to (11), including:
a real-time sound processing unit that performs predetermined sound correction processing on input sound and outputs real-time sound.

(13)
The information processing apparatus according to (12), further including:
a signal synthesis selection unit that performs reproduction processing of the recorded sound and the real-time sound on a basis of a control input.

(14)
The information processing apparatus according to (13),
in which the signal synthesis selection unit does not reproduce the real-time sound at a time of reproduction of the recorded sound.

(15)
An information processing system including:
a first device that acquires and outputs sound; and
a second device that includes a reproduction processing unit that performs reproduction of a recorded sound acquired by the first device on a basis of a reproduction start instruction for starting re-listening of the recorded sound from a position tracking back a predetermined time from a reproduction start time, at which the reproduction start instruction is input, to a position of a present time.

(16)
The information processing system according to (15),
in which the first device further includes
a data transmission unit that compresses data to be transmitted to the second device and transmits the compressed data, and
a data reception unit that expands data received from the second device.

(17)
The information processing system according to (16),
in which the first device further includes a sound feature calculation unit that calculates a feature amount included in waveform data of the acquired sound, and
the data transmission unit transmits the feature amount to the second device.

(18)

The information processing system according to (16),
in which the first device further includes a sound feature calculation unit that calculates a feature amount included in waveform data of the acquired sound, and
the data transmission unit determines, on a basis of the feature amount, a sound section to be transmitted to the second device in the acquired sound and transmits the sound section to the second device.

(19)

The information processing system according to any one of (15) to (18),
in which the second device includes an information presentation unit that presents information related to reproduction of recorded sound.

(20)

A program for causing a computer to function as:
a reproduction processing unit that performs reproduction of a recorded sound on a basis of a reproduction start instruction for starting re-listening of the recorded sound from a position tracking back a predetermined time from a reproduction start time, at which a reproduction start instruction is input, to a position of a present time.

REFERENCE SIGNS LIST 100 audio device
110 sound input unit
120 audio device data transmission unit
121 sound feature calculation unit
123 time stamp information generation unit
130 audio device data reception unit
140 signal synthesis selection unit
141 first signal synthesis selection unit
143 real-time sound processing unit
145 sound signal synthesis selection unit
150 sound output unit
160 cancellation signal generation unit
200 information processing device
210 reproduction processing unit
211 information processing device data reception unit
212 sound analysis processing unit
213 reproduction signal processing unit
215 information processing device data transmission unit
220 control input unit
231 first sound storage unit
233 second sound storage unit
240 information presentation unit
300 hearing-aid apparatus
302 sound input and output unit
304 reproduction processing unit
310 sound input unit
320 reproduction signal processing unit
321 sound analysis processing unit
330 signal synthesis selection unit
331 first signal synthesis selection unit
333 real-time sound processing unit
335 sound signal synthesis selection unit
340 control input unit
350 sound output unit
361 first sound storage unit
363 second sound storage unit
370 cancellation signal generation unit
380 information presentation unit

The invention claimed is:

1. An information processing apparatus comprising:
a reproduction processing unit that performs a reproduction of a recorded sound based on a reproduction start instruction for starting re-listening of the recorded sound from a position tracking back a predetermined amount of time from a reproduction start instruction time corresponding to a time at which the reproduction start instruction is inputted;
a selector interface that enables a user to select the predetermined amount of time to track back from the reproduction start instruction time; and
a cancellation signal generation unit that generates a cancellation signal to execute a noise cancellation function at least during reproduction of the recorded sound,
wherein the reproduction processing unit:
outputs a re-listening sound based on a portion of the recorded sound back-tracked from the reproduction start instruction time by the predetermined amount of time selected via the selector interface, and
commences output of a current real-time sound upon reaching a point in the recorded sound corresponding to the reproduction start instruction time.

2. The information processing apparatus according to claim 1,
wherein the selector interface enables the user to input a reproduction completion instruction to stop the re-listening sound from being output by the reproduction processing unit before reaching the point in the recorded sound corresponding to the reproduction start instruction time, and
wherein, when the reproduction completion instruction is input before reaching the point in the recorded sound corresponding to the reproduction start instruction time, the reproduction processing unit moves the point of the recorded sound corresponding to the reproduction start instruction time to a point of the recorded sound corresponding to when the reproduction completion instruction was input, such that the reproduction processing unit commences output of the current real-time sound after the re-listening sound has stopped due to the reproduction completion instruction inputted via the selector interface.

3. The information processing apparatus according to claim 1, further comprising:
a sound analysis processing unit that analyzes the recorded sound,
wherein the reproduction processing unit performs a sound emphasis processing based on an analysis result obtained by the sound analysis processing unit.

4. The information processing apparatus according to claim 1, further comprising:
a sound analysis processing unit that analyzes the recorded sound; and
an information presentation unit that presents information related to the recorded sound based on an analysis result obtained by the sound analysis processing unit.

5. The information processing apparatus according to claim 4, wherein the information presentation unit causes a display to display a sound waveform of the recorded sound.

6. The information processing apparatus according to claim 1, further comprising:
a real-time sound processing unit that performs a predetermined sound correction processing on input sound and outputs real-time sound.

7. The information processing apparatus according to claim 6, further comprising:

a signal synthesis selection unit that performs a reproduction processing of the recorded sound and the real-time sound based on a control input.

8. The information processing apparatus according to claim 7, wherein the signal synthesis selection unit does not reproduce the real-time sound at a time of reproduction of the recorded sound.

9. An information processing system comprising:
a first device that acquires and outputs sound; and
a second device that includes:
   a reproduction processing unit that performs a reproduction of a recorded sound acquired by the first device based on a reproduction start instruction for starting re-listening of the recorded sound from a position tracking back a predetermined amount of time from a reproduction start instruction time corresponding to a time at which the reproduction start instruction is inputted;
   a selector interface that enables a user to select the predetermined amount of time to track back from the reproduction start instruction time; and
   a cancellation signal generation unit that generates a cancellation signal to execute a noise cancellation function at least during reproduction of the recorded sound,
wherein the reproduction processing unit:
   outputs a re-listening sound based on a portion of the recorded sound back-tracked from the reproduction start instruction time by the predetermined amount of time selected via the selector interface, and
   commences output of a current real-time sound upon reaching a point in the recorded sound corresponding to the reproduction start instruction time.

10. The information processing system according to claim 9, wherein the first device further includes
   a data transmission unit that compresses data to be transmitted to the second device and transmits the compressed data, and
   a data reception unit that expands data received from the second device.

11. The information processing system according to claim 10, wherein
   the first device further includes a sound feature calculation unit that calculates a feature amount included in waveform data of the recorded sound, and
   the data transmission unit transmits the feature amount to the second device.

12. The information processing system according to claim 10, wherein
   the first device further includes a sound feature calculation unit that calculates a feature amount included in waveform data of the recorded sound, and
   the data transmission unit determines, based on the feature amount, a sound section in the recorded sound to be transmitted to the second device, and transmits the sound section to the second device.

13. The information processing system according to claim 9, wherein the second device includes an information presentation unit that presents information related to the reproduction of the recorded sound.

14. A non-transitory computer-readable medium comprising computer executable instructions that, when executed by a processor of a computer, cause the computer to function as:
   a reproduction processing unit that performs a reproduction of a recorded sound based on a reproduction start instruction for starting re-listening of the recorded sound from a position tracking back a predetermined amount of time from a reproduction start instruction time corresponding to a time at which the reproduction start instruction is inputted;
   a selector interface that enables a user to select the predetermined amount of time to track back from the reproduction start instruction time; and
   a cancellation signal generation unit that generates a cancellation signal to execute a noise cancellation function at least during reproduction of the recorded sound,
wherein the reproduction processing unit:
   outputs a re-listening sound based on a portion of the recorded sound back-tracked from the reproduction start instruction time by the predetermined amount of time selected via the selector interface, and
   commences output of a current real-time sound upon reaching a point in the recorded sound corresponding to the reproduction start instruction time.

* * * * *